(12) United States Patent
Heikkilä et al.

(10) Patent No.: US 7,361,273 B2
(45) Date of Patent: *Apr. 22, 2008

(54) SEPARATION OF SUGARS, SUGAR ALCOHOLS, CARBOHYDRATES AND MIXTURES THEREOF

(75) Inventors: Heikki Heikkilä, Espoo (FI); Päivi Sarmala, Kantvik (FI); Ari Kärki, Lohja (FI); Nina Nurmi, Helsinki (FI); Hannu Paananen, Kantvik (FI)

(73) Assignee: SaniscoSweetners Oy, Kantvik (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/509,266

(22) PCT Filed: Mar. 26, 2003

(86) PCT No.: PCT/FI03/00232

§ 371 (c)(1),
(2), (4) Date: Sep. 27, 2004

(87) PCT Pub. No.: WO03/080872

PCT Pub. Date: Oct. 2, 2003

(65) Prior Publication Data

US 2005/0161401 A1 Jul. 28, 2005

(30) Foreign Application Priority Data

Mar. 27, 2002 (FI) .................................. 20020592

(51) Int. Cl.
B01D 15/08 (2006.01)

(52) U.S. Cl. ...................... 210/635; 210/656; 210/659; 210/198.2; 127/46.2; 127/46.3

(58) Field of Classification Search ................ 210/635, 210/656, 659, 198.2; 127/46.2, 463
See application file for complete search history.

(56) References Cited

U.S. PATENT DOCUMENTS 3,982,956 A * 9/1976 Schoenrock et al. ........ 127/46.2
4,049,546 A * 9/1977 Rock .......................... 210/670

(Continued)

FOREIGN PATENT DOCUMENTS

EP          0 106 466          1/1988

(Continued)

OTHER PUBLICATIONS

Hackh's Chemical Dictionary, McGraw Hill, New York 1972, p. 625.*
PTO Translation 06-3081 of Japan Patent No. 04-158260, Mar. 2006.*

(Continued)

Primary Examiner—Ernest G. Therkorn
(74) Attorney, Agent, or Firm—Scully, Scott, Murphy & Presser, P.C.

(57) ABSTRACT

The present invention relates to a method of separating sugars and sugar alcohols from each other. More particularly the present invention relates to the use of a weakly basic anion exchange resin in a chromatographic separation process. The advantage of the present invention compared with the prior art is that it is especially suitable for separating reducing sugars in acidic conditions as well as for example in weakly acidic conditions. The method using chromatographic separation comprises at least one step where a weakly basic anion exchange resin is used in a chromatographic column or in a part of a column.

29 Claims, 12 Drawing Sheets

U.S. PATENT DOCUMENTS

| | | | | |
|---|---|---|---|---|
| 4,051,221 | A | * | 9/1977 | Pannekeet et al. ............. 423/54 |
| 4,111,714 | A | * | 9/1978 | Hippchen et al. .......... 127/46.2 |
| 4,145,486 | A | * | 3/1979 | Haag et al. .................... 521/31 |
| 4,718,946 | A | * | 1/1988 | Fries ........................ 127/46.2 |
| 4,799,965 | A | * | 1/1989 | Bakker et al. ............. 127/46.2 |
| 4,968,353 | A | * | 11/1990 | Kawasaki et al. ......... 127/46.2 |
| 5,068,419 | A | * | 11/1991 | Kulprathipanja et al. ... 562/580 |
| 5,084,104 | A | * | 1/1992 | Heikkila et al. ............ 127/46.2 |
| 5,094,694 | A | * | 3/1992 | LaBrie et al. ............. 127/46.2 |
| 5,126,500 | A | * | 6/1992 | von Deessen et al. ....... 536/4.1 |
| 5,482,631 | A | * | 1/1996 | Saska et al. ................ 210/635 |
| 5,637,225 | A | * | 6/1997 | Heikkila et al. ............ 210/659 |
| 5,730,877 | A | * | 3/1998 | Heikkila et al. ............ 210/659 |
| 5,772,874 | A | * | 6/1998 | Quinn et al. ............. 210/198.2 |
| 5,795,398 | A | * | 8/1998 | Hyoky et al. ............. 127/46.1 |
| 5,863,438 | A | * | 1/1999 | Katzakian et al. .......... 210/674 |
| 6,146,856 | A | * | 11/2000 | Heikkila et al. ............ 435/100 |
| 6,153,791 | A | * | 11/2000 | Moore ........................ 562/513 |
| 6,224,683 | B1 | | 5/2001 | Tanikawa et al. .......... 127/46.3 |
| 6,475,552 | B1 | * | 11/2002 | Shah et al. ................ 426/658 |
| 6,599,722 | B2 | | 7/2003 | Boston et al. ............. 435/137 |
| 2002/0058715 | A1 | * | 5/2002 | Asakawa ..................... 521/26 |
| 2004/0006222 | A1 | * | 1/2004 | Paananen et al. ...... 536/123.13 |
| 2005/0061313 | A1 | * | 3/2005 | Jumppanen et al. .......... 127/30 |
| 2005/0096464 | A1 | * | 5/2005 | Heikkila et al. ............ 536/124 |

FOREIGN PATENT DOCUMENTS

| | | |
|---|---|---|
| EP | 0 262 711 | 4/1988 |
| JP | 4-158260 * | 6/1992 |
| WO | WO 91/03574 | 3/1991 |
| WO | WO 00/42225 A1 | 7/2000 |
| WO | WO 02/27037 | 4/2002 |
| WO | WO 02/27038 | 4/2002 |
| WO | WO 02/27039 | 4/2002 |

OTHER PUBLICATIONS

Patent Abstract of Japan No. JP 11221100, dated Aug. 17, 1999.
Patent Abstracts of Japan No. JP 2001128700, dated May 15, 2001.
An Abstract of Trusova, et al., "Chromatographic Determination of Carbohydrates and Ketonic Acids in Culture Media", Trudy-Vsesoyuznyi Gosudarstvennyl Nauchno-Kontrol'nyi Institut Veterinarnykh Preparatov, 29-30, 114-21 (1980).
An Abstract of Wolfgang Blaschek, "Complete Separation and Quantification of Neutral Sugars From Plant Cell Walls and Mucilages by High-Performance Liquid Chromatography", Journal of Chromatography 256(1), 157-63 (1983).

* cited by examiner

SEPARATION OF SUGARS, SUGAR ALCOHOLS, CARBOHYDRATES AND MIXTURES THEREOF

REFERENCE TO RELATED APPLICATIONS

This application is a 371 of PCT/FI03/00232 filed Mar. 26, 2003.

FIELD OF THE INVENTION

The present invention relates to a method for separating sugars and sugar alcohols from each other. More particularly the present invention relates to the use of a weakly basic anion exchange resin in a chromatographic separation process.

BACKGROUND OF THE INVENTION

Japanese patent application JP-1990000281929 discloses the use of a liquid chromatography column filled with filler having weakly basic anion exchangeable radical for analyzing saccharide (monosaccharide or oligosaccharide). The filler has first class amino radical, second class amino radical and/or third class amino radical. The column is first eluted with 0.1 N $HNO_3$ water solution and then the column is eluted with absolute methanol.

U.S. Pat. No. 5,482,631 discloses a method for separating inositol from sugar and sugar alcohols. The method comprises a resin, which comprises a strong base anion exchange resin in chloride form. The method is performed in a simulated moving bed chromatographic system.

Tanaka H. et al. describe in their article "Determination of Component Sugars in Soil Organic Matter by HPLC" in Zentralbl. Mikrobiol. 145(1990), 621-628, a method for determining component sugars of soil carbohydrates. In the method a column of strong-base anion exchange resin was used and glucose, galactose, mannose, xylose, rhamnose and ribose were separated. However, arabinose, fucose and fructose were eluted in the same peak and they could not be separated from each other.

U.S. Pat. No. 6,153,791 discloses a process for the purification of 2-keto-L-gulonic acid by continuous liquid chromatography using a weakly basic ion exchanger. According to the publication the weakly basic ion exchange resin comprises anionic exchange resin having pyridine functionality. However, the method is only capable of separating 2-keto-L-gulonic acid from sorbose and therefore sugars cannot be separated from each other with this method.

Paskach, T. et al. have described in their article "High-performance anion-exchange chromatography of sugars and sugar alcohols on quaternary ammonium resins under alkaline conditions" in Carbohyd. Res. 215 (1991)1-14, the use of strongly basic high performance liquid chromatography with quaternary ammonium resins to separate sugars and sugar alcohols.

Murphy, P. T. et al. have stated in their article "A reversible reaction between reducing sugars and a weak-base anion-exchange resin" in Carbohyd. Res., 7 (1968) 460-467, that caution should be exercised in using a weak-base anion-exchange resin in the presence of reducing sugars. According to the article it is well known that contact between a strong-base anion-exchange resin and reducing sugars leads to epimerisation and irreversible sorption. In the article it is shown that in attempts to use weak-base anion-exchange resins in the presence of free sugars, the researchers have frequently detected significant losses of neutral sugars. In the article it is shown that the effect is caused by the reversible formation of a covalent compound between the resin and the reducing sugar.

WO publication 00/42225 describes a method for separating sugars while still allowing ready desorption from the resin. The method comprises the use of a strong base anion exchange resin in chloride form. The resin has been conditioned with a sufficient concentration of hydroxyl ion.

Bilik, V. et al. in their article in Chem zvesti 33 (1) 118-122 (1979) have described the separation of ketoses and aldoses with polyethyleneimine ion exchanger in the Cl or OH form eluted with water. With the method described 9 ketoses and 14 aldoses were separated. However, the ketoses and aldoses cannot be separated from each other. Also the manufacture of spherical particles, starting from polyethyleneimine and epichlorohydrin, is more difficult compared with conventional starting materials like styrene, acrylates, acrylonitrile and divinylbenzene. Ethyleneimine is also considered to be quite hazardous material.

Lindberg B. et al. in Carbohyd. Res. 5 (1967) 286-291, have studied the use of strongly basic anion-exchange resin in the bisulphite form for the preparative separation of sugars. The utility of the bisulphite-column method was demonstrated not only by the separation of ketoses from aldoses but also by the preparation of chromatographically pure D-fructose, D-glucose and D-galactose from commercial products.

Oshima R. et al. have studied separation of anomers of saccharides by strongly basic macroreticular anion exchange resin in the sulphate form. The resin has a relatively high degree of cross-linking. The method is carried out at room temperature and the eluant is ethanol-water solution (80%/20%). The experiments showed that the higher percentage of ethanol enhanced the separation. 2-deoxy-ribose, rhamnose, fucose, galactose, xylose, mannose, fructose, sorbitol, galactose, glucose, lactose, maltose, sucrose and raffinose were separated by the process.

Bauer and Voelter have described an analytical separation technique for carbohydrates in Chromatographia, Vol 9, No 9, September 1976. According to Bauer and Voelter sugars react with boric acid to form anionic complexes and are as such separable on strongly basic ion-exchange resins. In the method optimisation of the conditions of separation and detection allowed the separation and detection of 10 sugars to take place faster than with the previous methods.

Brown, W. has described the selectivity of polyacrylamide gel adsorbents for sugars in the article in J. Chromatog. 53 (1970) 572-575. The resin used in the method is a polyacrylamide resin, and the sugars separated by the process are raffinose, sucrose, rhamnose, galactose, glucose, fructose/mannose and xylose. However, the amide groups of polyacrylamide do not possess ion exchange capacity.

Malan, A. et al. have described in their article in Ann. Fals. Exp. Chim., July-August, 1988, 81, no 869, pp 275-281, a method for separating for example sucrose, maltose, lactose, mannose, fructose, arabinose, xylose, glucose and its invertsugars with a strongly basic anion exchange resin.

BRIEF DESCRIPTION OF THE INVENTION

Surprisingly it has been found out that sugars and sugar alcohols can be effectively separated from carbohydrate streams by using a weakly basic anion (WBA) exchange resin. The advantage of the present invention compared to the prior art is that it is especially suitable for separating reducing sugars in acidic conditions as well as for example in weakly acidic conditions.

The objects of the invention are achieved by a method which is characterized by what is stated in the independent claims. The preferred embodiments of the invention are disclosed in the dependent claims.

The present invention relates to a method for separating sugars, sugar alcohols and other carbohydrate compounds from a solution containing at least two of them by a method using chromatographic separation comprising at least one step where a weakly basic anion exchange resin is used for the chromatographic separation. The solution to be separated chromatographically contains monosaccharides, disaccharides, trisaccharides, oligosaccharides, corresponding sugar alcohols, polyols and mixtures thereof. The monosaccharides are for example pentose, hexose, tetrose monosaccharides, deoxyhexose, deoxypentose and anhydroalditols. The disaccharides are for example tetrose, pentose or hexose disaccharides. The sugar alcohols and polyols are for example xylitol, erythritol, inositol, mannitol and glycerol. Preferably the weakly basic anion exchange resin is used for separating xylose, arabinose, rhamnose, glycerol, inositol and betaine. Preferably the weakly basic anion exchange resin is used for separating inositol and glycerol from betaine.

The method preferably contains additional steps comprising the use of chromatographic columns containing weakly acid cation (WAC) exchange resins, strongly acid cation (SAC) exchange resins, strongly basic anion (SBA) exchange resins, evaporation, crystallization, membrane processes etc.

An advantage of the method and arrangement of the invention is that the separation can be performed in a pH range where sugars are more stable. The separation can be carried out in acidic conditions and no chemicals, e.g. NaOH, for adjusting the pH are needed compared with the chromatographic separation with a weakly acid cation exchange resin. The chromatographic separation process is also less complicated and economical benefits result from this. One of the advantages is also that the resin can be packed in acidic conditions. By contrast, the weakly acid cation exchange resin has been difficult to pack in acidic conditions.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
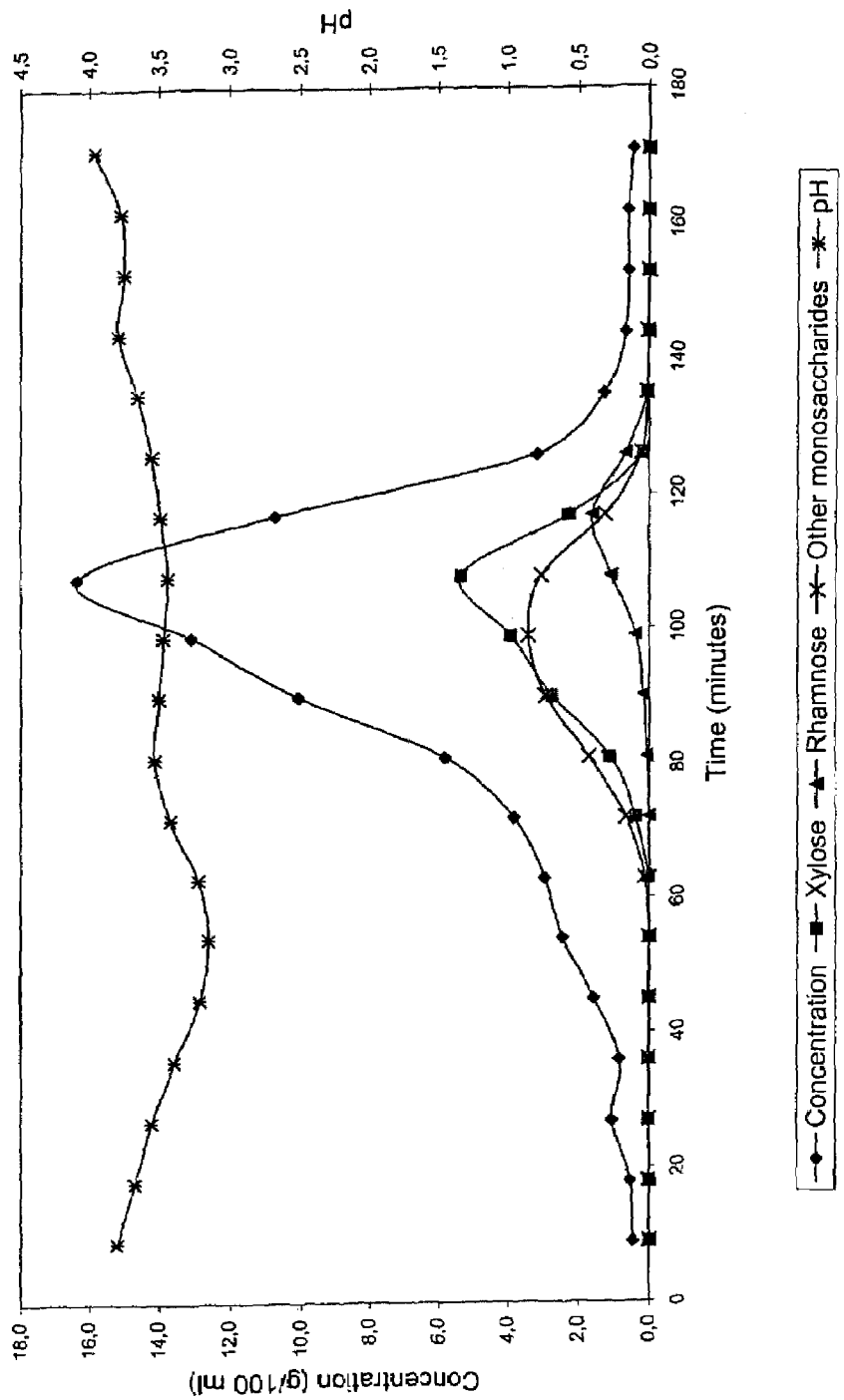
FIG. 1 is a graphical presentation of the elution profiles and pH according to Example 1.
Figure 2:
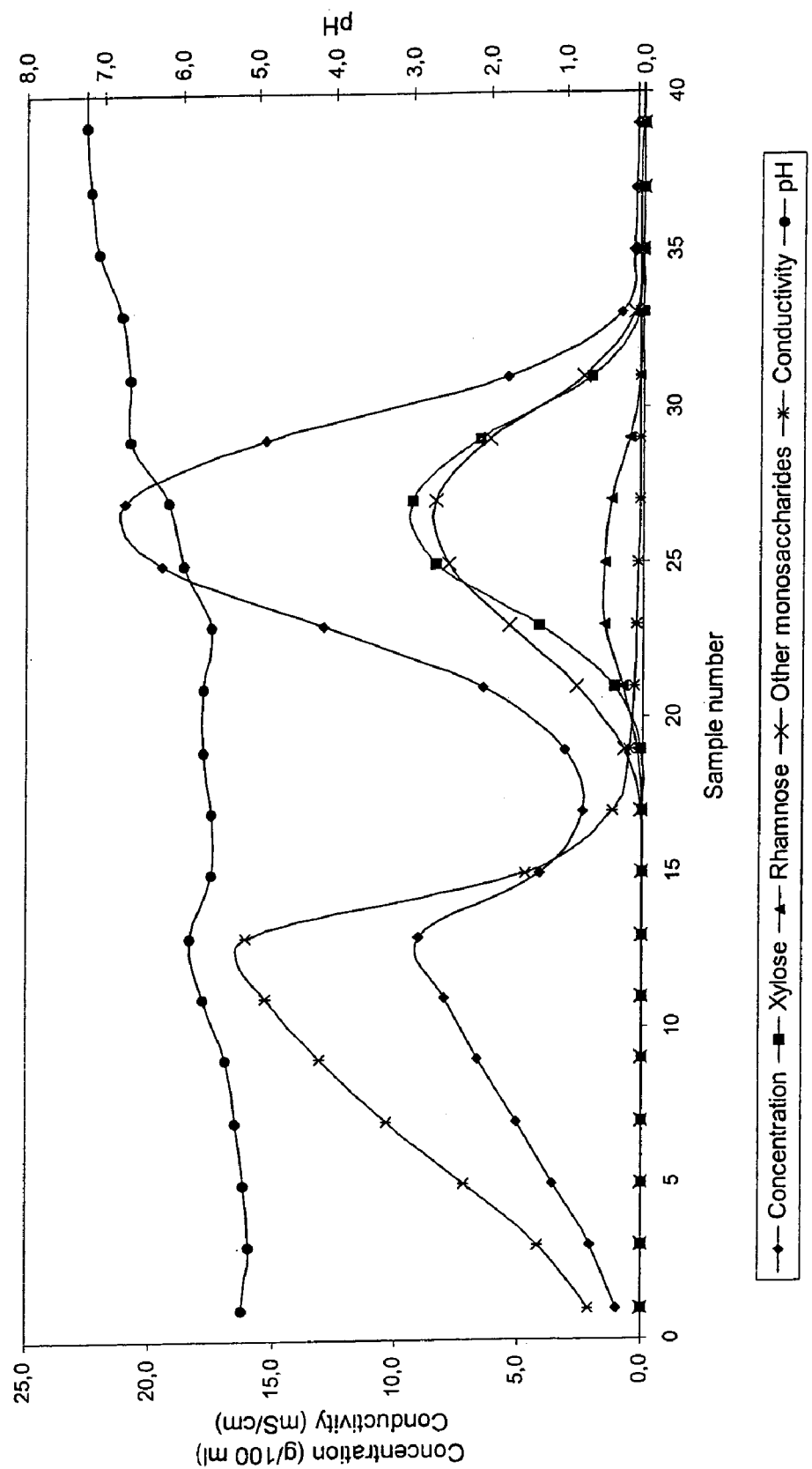
FIG. 2 is a graphical presentation of the elution profiles and pH according to Example 2.
Figure 3:
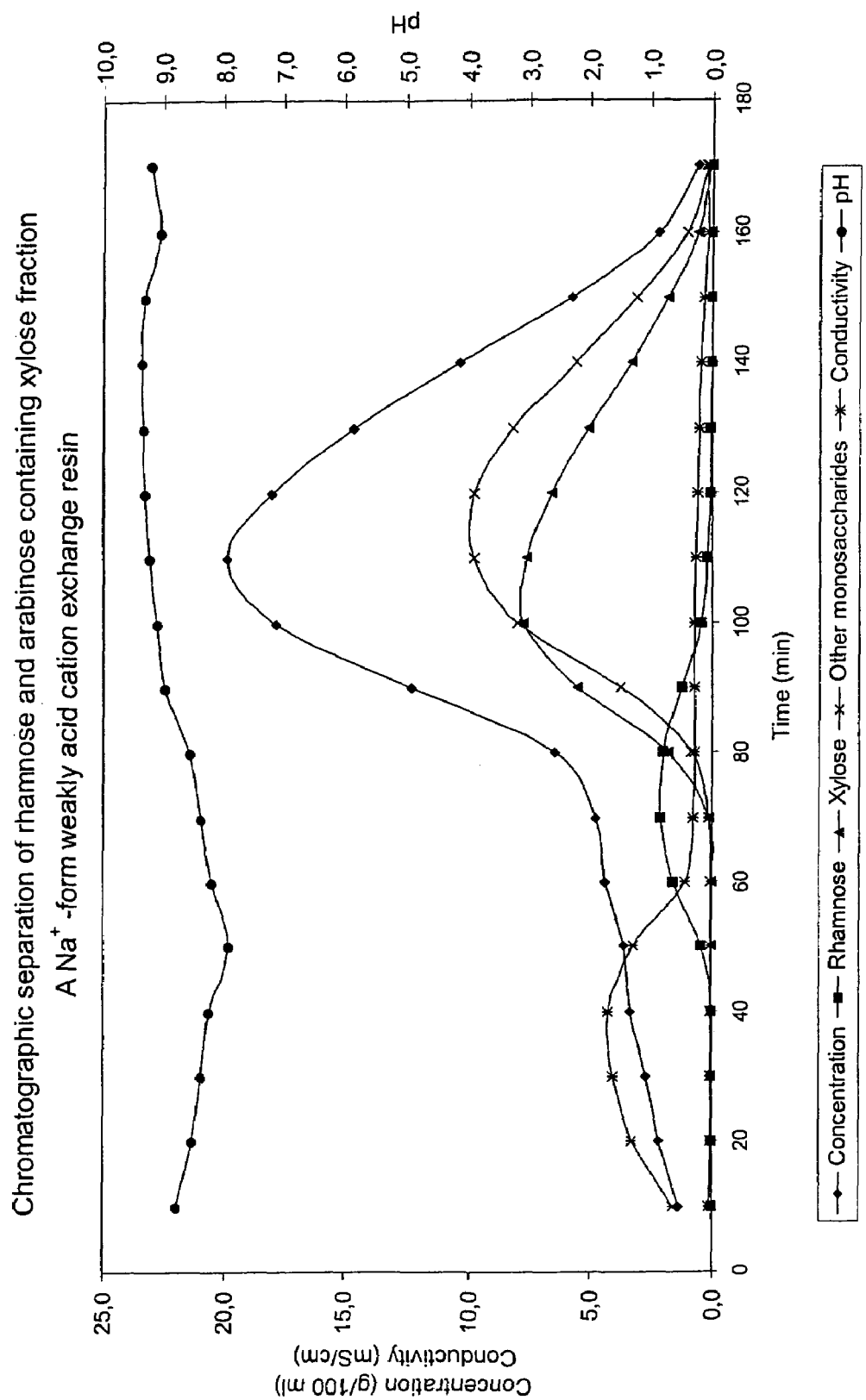
FIG. 3 is a graphical presentation of the elution profiles and pH according to Example 3.
Figure 4:
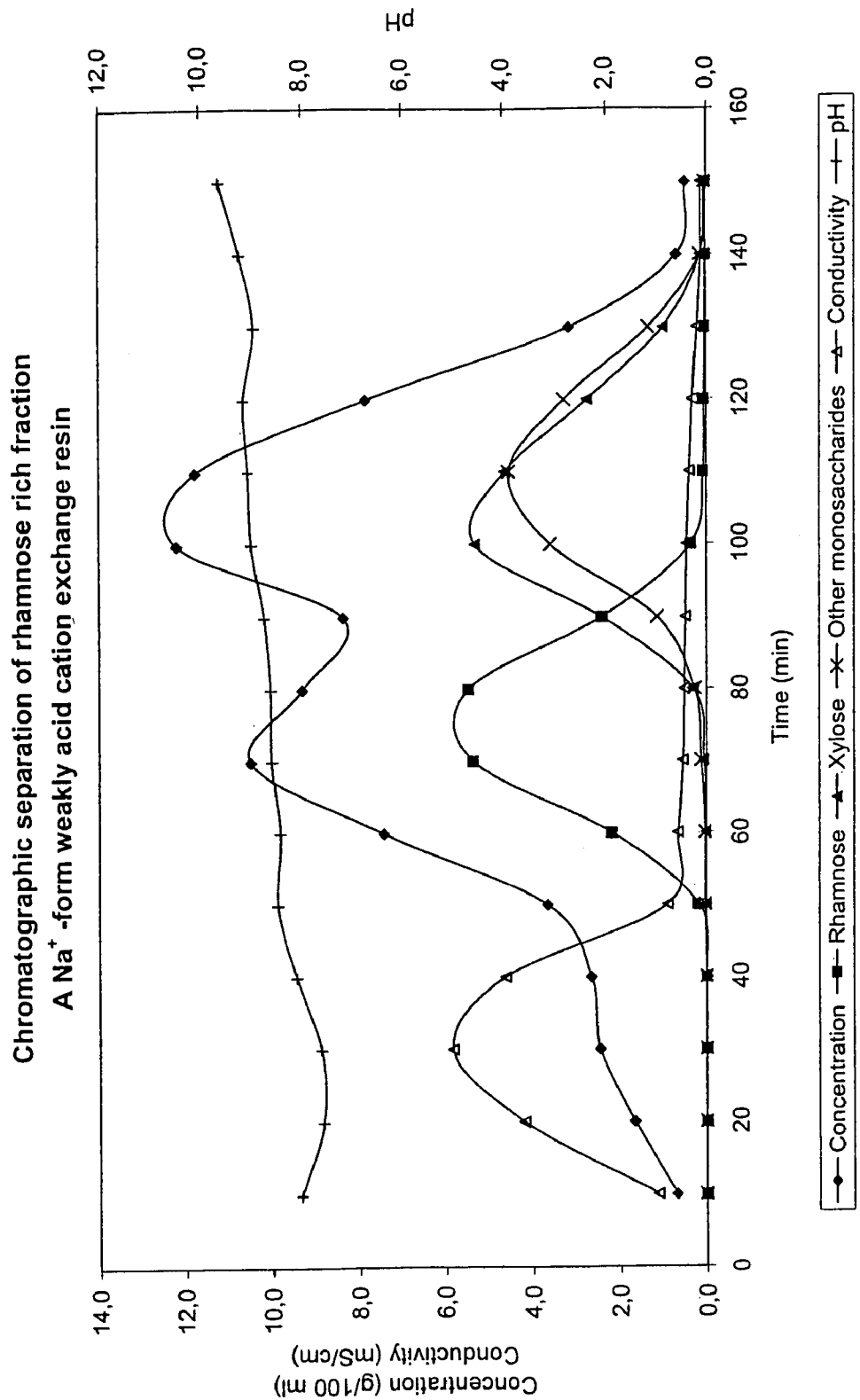
FIG. 4 is a graphical presentation of the elution profiles and pH according to Example 4.

According to the present invention a solution containing at least two of the sugars, sugar alcohols and/or other carbohydrates or mixtures thereof is subjected to a method using chromatographic separation comprising at least one step where a weakly basic anion exchange resin is used in a chromatographic column or in a part of a column. Weakly basic anion exchange resin is in this context a resin, which contains mainly weakly basic anion groups.

The sugars to be separated are preferably selected from the group consisting of monosaccharides, disaccharides, trisaccharides and oligosaccharides. The monosaccharides are for example pentose, hexose, tetrose monosaccharides, deoxyhexose, deoxypentose and anhydroalditols. The disaccharides are for example tetrose, pentose or hexose disaccharides. The sugar alcohols to be separated are preferably selected from a group consisting of xylitol, erythritol and inositol. The other carbohydrates to be separated are for example polyols, such as glycerol. Preferably the weakly basic anion exchange resin is used for separating xylose, arabinose, rhamnose, glycerol, inositol and betaine. Preferably the weakly basic anion exchange resin is also used for separating inositol and glycerol from betaine.

The method according to the invention may preferably comprise additional steps, such as using chromatographic columns containing weakly acid cation exchange resins, strongly acid cation exchange resins, strongly basic anion exchange resins, evaporation, crystallization, ion exchange, membrane processes etc. in order to enhance the effective separation of the desired product or products.

Suitable starting raw materials are solutions, hydrolysates and extracts from plants containing aforementioned sugars, sugar alcohols and/or carbohydrates or raw materials converted thereof containing aforementioned sugars, sugar alcohols and/or carbohydrates. Examples of such starting materials are for example biomass hydrolysates, molasses, vinasse, xylose process streams, sucrose process streams, and their side streams, starch or sucrose based streams for example maltose, glucose or fructose process streams or their side streams.

The chromatographic column or a part of the column used in the method of the present invention is filled with a weakly basic anion exchange resin, preferably with a weakly basic anion exchange resin having an acrylic skeleton. The weakly basic anion exchange resin is preferably derived from acrylic esters ($H_2$=CR—COOR', where R is H or $CH_3$ and R' is alkyl group, like methyl, ethyl, isopropyl, butyl etc.), like methyl acrylate, ethyl acrylate, butyl acrylate, methyl methacrylate, acrylonitrile or acrylic acids or mixture thereof. The acrylic matrix is crosslinked with a suitable crosslinker which can be, for example of aromatic type like divinylbenzene (DVB) or of aliphatic type, like isoprene, 1,7-octadiene, trivinylcyclohexane, diethylene glycol divinyl ether, N,N'-methylenebisacrylamide, N,N'-alkylene bisacrylamides, ethyleneglycol dimethacrylate and other di-, tri-, tetra-, pentacrylates and pentamethacrylates. A suitable crosslinking degree with divinylbenzene is from 1 to 10 weight-% DVB, preferably from 3 to 8 weight-%. The weakly basic anion resin is manufactured of the crosslinked polyacrylic polymer by amination with suitable amine like mono-, di-, tri-, tetra-, penta- or hexamines or other polyamines. For example dimethylamine, diethylene triamine, triethylene tetramine, tetraethylene pentamine, pentaethylene hexamine and dimethylaminopropylamine are suitable amines.

Another weakly basic anion exchange resin structure is epichlorohydrin-based polycondensation anion exchangers. The chloromethyl and epoxy group of epichlorohydrin react with polyamines forming crosslinked gel type anion exchangers. For example the condensation reaction of epichlorohydrin with triethyleneteramine results following anion resin structure. This type of anion resin contains both weakly basic (tertiary amine) and strongly basic (quaternary ammonium) functional groups.

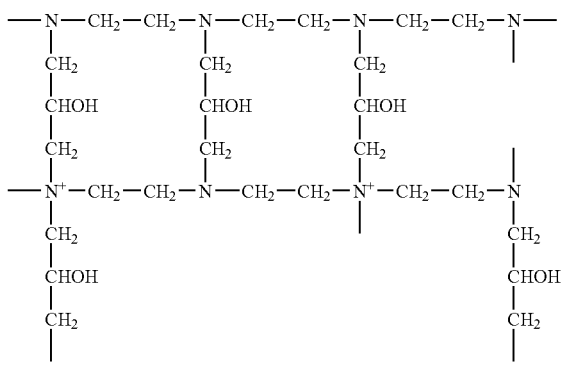

In comparison with the polyacrylic type resins the epichlorohydrin-based resins are more difficult to produce in bead form by suspension polymerization technique, which is a favourable physical form of an ion exchange product for chromatographic purposes. For example U.S. Pat. No. 4,184,019 shows some methods for producing the epichlorohydrin based resins in bead form. It is clear from the U.S. patent that the methods are difficult to carry out since they require the use of special solvents.

Another class of weakly basic anion exchange resins is the aminated polycondensation products of phenol and formaldehyde.

Another well known way to produce weakly basic anion exchange resins are the aliphatic amines and ammonia polycondensation resins. Cross-linked resin structures are formed when monomeric amines or ammonia are reacted for example with formaldehyde. The reaction between amine and formaldehyde forms methylol and/or azomethine groups, which can further react to form polycondensates. A well-known structure of this type is a reaction resin of formaldehyde, acetone and tetraethylenepentamine. Aromatic amines can also be cross-linked with formaldehyde resulting in a weakly basic anion exchanger.

Different types of cross-linked polyvinylpyridine based ion exchangers having pyridine as the functional group are also useful as weakly base anion exchangers.

The average particle size of the resin is normally 10 to 2000 micrometers, preferably 100 to 400 micrometers.

The resin may be regenerated for example into $SO_4^{2-}$-form. However, this depends on the ionic composition of the surrounding solution.

The chromatographic separation process using weakly basic anion exchange resin has been carried out as batch processes in the Examples of the present application. However, in industrial applications simulated moving bed (SMB) systems are preferable. The simulated moving bed system is either sequential or continuous.

The column is preferably eluted at temperatures which are selected based on the stability of the solution to be separated and the resin to be used in the separation.

One preferred eluant in the chromatographic separation of the present invention is water, for instance demineralised water or condensate water, or some aqueous solution, alcohol or a mixture thereof. Preferably the eluant is water and most preferably the eluant is condensate water.

The pH of the feed solution is either acidic, neutral or basic. Preferably the pH of the feed solution is weakly acidic. The dry substance content of the feed solution is adjusted to an appropriate level and after that the feed solution is preheated.

Advantageously a special feeding device can be used for feeding the solution to the column to assure steady feeding. The feed solution is eluted in the column by a feeding eluant, e.g. water, for example preheated ion-exchanged water to the top of the column. The pH and the ion form of the resin can be balanced by several feeds before equilibrium is reached. The flow rate in the column is adjusted to an appropriate level. The fractions of the outcoming solutions are collected at suitable intervals and analysed. The term "fractions of the outcoming solutions" means in this application all fractions coming out of the column.

It is obvious to a person skilled in the art that the process parameters are selected every time individually, depending on the compounds to be separated. For example the temperature of the column, the feed solution and the eluant can be from 10 to 95° C., preferably from 40 to 95° C.

It is clear to a person skilled in the art that the method can be altered by reorganizing the order of the process units or by adding or removing some process units. A person skilled in the art may also add or alter the order of other separation, recovering and concentration units.

Furthermore, it is possible to arrange two or more chromatographic columns in sequence, wherein at least one column or part of a column contains a weakly basic anion exchange resin and the other columns or part of the columns contain other column filling materials, e.g. strongly acid cation exchange resin or strongly basic anion exchange resin. For example, it is possible to separate a rhamnose-containing fraction from the feed solution with a weakly acid cation exchange resin and after that feed the rhamnose-containing fraction of the weakly acid separation to a weakly basic anion exchange chromatographic separation and further separate a, rhamnose-containing fraction from the other components. It is also possible simultaneously to separate other possibly desired products from the rhamnose containing fraction. On the other hand it is possible to purify a certain fraction, for example betaine fraction, with a strongly acid cation exchange resin after it has first been separated from the feed solution with a weakly basic anion exchange resin. According to one embodiment of the present invention the feed solution can also be first subjected to a strongly acid cation exchange resin and after that the resulting rhamnose containing solution can be subjected to a weakly basic anion exchange resin.

Various possibilities to combine weakly acid cation exchange resins, strongly acid cation exchange resins and weakly basic cation exchange resins are shown in the Examples. The separation of xylose crystallization run-off with strongly acid cation exchange resin is shown in Example 2, after which separation the xylose fraction is fed to a weakly acid cation exchange resin according to Example 3. The rhamnose-containing fraction produced according to Example 3 is then fed to a weakly acid cation exchange resin according to Example 4 or to a weakly basic anion exchange resin according to Example 5. The rhamnose yield of both Examples 4 and 5 was good.

The further chromatographic separation of the rhamnose-containing fraction of Example 4 with a strongly acid cation exchange resin is shown in Example 6 and the separation of the rhamnose containing fraction, which has been obtained in the same way as in Example 5 with a strongly acid cation exchange resin, is shown in Example 7.

The chromatographic separation of glycerol and inositol from betaine is shown in Example 8. A strongly acid cation exchange resin can be used to purify the betaine fraction when salts are removed. On the other hand vinasse can also be fed to a column containing a strongly acid cation exchange resin prior to the chromatographic separation with a weakly basic anion exchange resin.

The chromatographic separation of oligosaccharides, maltose and glucose from each other with a weakly basic anion exchange resin is shown in Example 9. With weakly basic anion exchange resin maltose can be separated in good yield from the other components.

The chromatographic separation of maltose from starch hydrolysate with a strongly acid cation exchange resin is shown, in Example 10.

The chromatographic separation of betaine and inositol from a solution containing them with a weakly basic anion exchange resin is shown in Example 11.

The comparison of selectivities of different compounds with weakly acid cation exchange resin, strongly acid cation exchange resin and weakly basic anion exchange resin is shown in Example 12.

It is generally known that when using the weakly basic anion exchange resin with acrylic skeleton the resin is more tolerant for example for the organic fouling, which has been a problem in chromatographic separation e.g. with strongly basic anion exchangers. Sugars tend to decompose in high values of pH. One advantage of the present invention is that the separation is carried out in lower values of pH and the reducing sugars have a good stability in pH values from 3 to 5. In acidic conditions the weakly basic cation exchange resin is in ionic form. Another advantage of the present invention is that the separation can be carried out in an acidic sugar solution. The weakly basic anion exchange resin is especially advantageous when separating reducing sugars.

It will be obvious to a person skilled in the art that, as the technology advances, the inventive concept can be implemented in various ways. The invention and its embodiments are not limited to the examples described but may vary within the scope of the claims.

EXAMPLES

Example 1

Chromatographic Separation of Xylose Crystallization Run-off with an $H^+/Mg^{2+}$ Form Weakly Acid Cation Exchange Resin Xylose crystallization run-off from a/the xylose production process based on Mg-si-spent liquor (beech wood) was subjected to a chromatographic separation. The separation was performed in a chromatographic separation column as a batch process. The equipment consisted of feed and eluant water containers having a heat jacket, a chromatographic separation column, pipelines for input of feed solution as well as eluant water pipelines, a pump and a sample collector for outflow. The column with a diameter of 0.045 m was filled with an acrylic weakly acid cation exchange resin (Finex CA 12 GC) manufactured by Finex Ltd., Finland. The resin was an ethyl-acrylate-based resin. The height of the resin bed was about 0.70 m. The cross-linkage degree of the resin was 6.0% DVB and the average particle size of the resin was 0.26 mm. The resin was regenerated into mainly $H^+$ form (94%) and partly $Mg^{2+}$ form (6%) and a feeding device was placed at the top of the resin bed. The temperature of the column and feed solution and eluant water was approximately 65° C. The flow rate in the column was adjusted to 4 ml/min. Filtration of the feed solution was carried out by vacuum filtration before tests.

The chromatographic separation was carried out as follows:

Step 1: The dry substance content of the feed solution was determined and adjusted to 25 g dry substance in 100 g solution according to the refractive index (RI) of the solution. The pH of the feed solution was 3.5.

Step 2: 100 ml of preheated feed solution was injected to the top of the resin bed (through the feeding device).

Step 3: The feed solution was eluted downwards in the column by, feeding preheated ion-exchanged water to the top of the column. The pH and ion-form of the resin were balanced by several feeds before sampling.

Step 4: 10-ml samples of the outcoming solution were collected at 3 min intervals. The composition of the samples was analyzed with HPLC (PED).

The resin gives a good separation of rhamnose from other monosaccharides. Rhamnose is eluted at the end of the profile when rhamnose is eluted before the other monosaccharides with $Na^+$ form WAC-resin. Rhamnose is also eluted before other monosaccharides with WBA-resin but rhamnose is eluting with SAC-resin simultaneously with other monosaccharides.

Example 2

Chromatographic Separation of Xylose Crystallization Run-off with a $Na^+$-Form Strong Acid Cation Exchange Resin Xylose crystallization run-off from a/the xylose production process based on Ca-si-spent liquor (birch wood) was subjected to a chromatographic separation in a batch separation column. The separation was performed in a pilot scale chromatographic separation column as a batch process.

The equipment consisted of a feed tank, a feed pump, a heat exchanger, a chromatographic separation column, product containers, pipelines for input of feed solution as well as eluant water, pipelines for output and flow control for the outcoming liquid.

The column with a diameter of 0.225 m was filled with a strong cation exchange resin (manufactured by Finex Ltd, Finland). The height of the resin bed was approximately 5.1 m. The degree of cross-linkage was 5.5% DVB and the average particle size of the resin was 0.41 mm. The resin was regenerated into sodium ($Na^+$) form and a feeding device was placed at the top of the resin bed. The temperature of the column, feed solution and eluant water was approximately 65° C. The flow rate in the column was adjusted to 30 l/h.

The feed solution was pre-treated by filtration by using a pressure filter and diatomaceous earth as filter aid. The feed solution was then heated to 65° C. and the pH was adjusted to pH 6, after which the solution was filtered.

Chromatographic separation was carried out as follows:
Step 1. The dry substance content of the feed solution was determined and adjusted to 35 g dry substance in 100 g of solution according to the refractive index (RI) of the solution.
Step 2. 15 l of the preheated feed solution was pumped to the top of the resin bed (through the feeding device).
Step 3. The feed solution was eluted downwards in the column by feeding preheated ion-exchanged water to the top of the column. The pH and ion-form of the resin were balanced by several feeds before sampling.
Step 4. The density and conductivity of the outcoming solution were measured continuously. The outcoming solution was collected and divided into two fractions in the following order: residual fraction (containing most of the salts) and xylose fraction (containing xylose, rhamnose, arabinose and other monosaccharides).

The amount of dry substance as well as rhamnose, arabinose and xylose content in the feed solution and in product fraction (xylose fraction) are presented in Table 1. The concentrations of the components are expressed as percentages of the total dry substance in the particular fraction. The yield of rhamnose, arabinose and xylose in a/the product fraction are also presented (the amount of the component in the particular fraction in relation to the total amount of that component in all outcoming fractions). The color (ICUMSA, measured at pH 5) of the feed solution and product fraction are also presented, as well as color removal %.

TABLE 1

Compositions, yields and colors

|  | Feed solution (nominal) | Xylose fraction (analyzed from samples) | Residual fraction (analyzed from samples) |
| --- | --- | --- | --- |
| DS in fraction, kg | 5.9 | 4.3 | 2.1 |
| DS g/100 g solution | 34.5 | 9.3 | 3.5 |
| Rhamnose, % on DS | 5.6 | 7.1 | 0.04 |
| Arabinose, % on DS | 2.8 | 3.9 | 0.03 |
| Xylose, % on DS | 26.0 | 37.7 | 0.1 |
| Color, ICUMSA | 38 900 | 5 000 |  |
| Rhamnose, yield % |  | 99.7 |  |
| Arabinose, yield % |  | 99.6 |  |
| Xylose, yield % |  | 99.9 |  |
| Color removal, % |  | 87.1 |  |

Most of the salts and color were removed from xylose crystallization run-off with a $Na^+$ form strong acid cation exchange resin. Also the content of rhamnose, arabinose and xylose were higher in the product fraction than in the feed solution.

Example 3

Chromatographic Separation of Rhamnose and Arabinose Containing Xylose Fraction with Weakly Acid Cation Exchange Resin Xylose fraction prepared according to Example 2 (containing xylose, rhamnose, arabinose and other monosaccharides) was subjected to a chromatographic separation in a batch separation column. The separation was performed in a pilot scale chromatographic separation column as a batch process.

The equipment consisted of a feed tank, a feed pump, a heat exchanger, a chromatographic separation column, product containers, pipelines for input of feed solution as well as eluant water, pipelines for output and flow control for the outcoming liquid.

The column with a diameter of 1.0 m was filled with a weakly acid cation exchange resin (Finex CA 16 GC) manufactured by Finex Ltd, Finland. The resin was methylacrylate-based resin. The height of the resin bed was approximately 5.0 m. The degree of cross-linkage was 8 w-% DVB and the average particle size of the resin was 0.28 mm. The resin was regenerated into sodium ($Na^+$) form and a feeding device was placed at the top of the resin bed. The temperature of the column, feed solution and eluant water was 65° C. The flow rate in the column was adjusted to 785 l/h.

The pH of the feed solution was adjusted to pH 6.5 after which the solution was filtered.

Chromatographic separation was carried out as follows:
Step 1. The dry substance content of the feed solution was adjusted to 35 g dry substance in 100 g of solution according to the refractive index (RI) of the solution.
Step 2. 400 l of the preheated feed solution was pumped to the top of the resin bed.
Step 3. The feed solution was eluted downwards in the column by feeding preheated ion-exchanged water to the top of the column. The pH and ion-form of the resin were balanced by several feeds before sampling.
Step 4. The density and conductivity of the outcoming solution were measured continuously. The outcoming solution was collected and divided into three fractions (when the feed profiles were not overlapping) in the following order: residual fraction (containing most of the salts), rhamnose-rich fraction (containing most of the rhamnose) and xylose-rich fraction (containing most of the xylose, arabinose and other monosaccharides).

The amount of dry substance as well as rhamnose and xylose content in the feed solution and in product fractions are presented in Table 2. The concentrations of the components are expressed as percentages of the total dry substance content in the particular fraction. The yield of rhamnose and xylose in product fractions is also presented (the amount of the component in the particular fraction in relation to the total amount of that component in all outcoming fractions).

TABLE 2

Compositions and yields, composition of fractions were analyzed from samples

|  | Feed solution (nominal) | Rhamnose fraction | Xylose fraction | Residual fraction |
| --- | --- | --- | --- | --- |
| DS in fraction, kg | 160 | 44 | 114 | 11 |
| DS g/100 g solution | 36.1 | 6.2 | 10.6 | 2.3 |
| Rhamnose, % on DS | 6.7 | 21.9 | 0.9 | 0.2 |
| Xylose, % on DS | 37.4 | 24.5 | 36.5 | 2.3 |
| Rhamnose, yield % |  | 90.4 | — | — |
| Xylose, yield % |  | — | 79.0 | — |

The rhamnose content (% of the total dry substance content) in a/the rhamnose-rich product fraction was 3.3-fold compared to the rhamnose content in a/the feed solution. Rhamnose was separated from the feed solution with a good yield.

Example 4

Chromatographic Separation of Rhamnose-Rich Fraction with a Weakly Acid Cation Exchange Resin A/The rhamnose rich fraction prepared according to Example 3 was subjected to a chromatographic separation in a batch separation column. The separation was performed in an industrial scale chromatographic separation column as a batch process.

The equipment consisted of a feed tank, a feed pump, a heat exchanger, a chromatographic separation column, product containers, pipelines for input of feed solution as well as eluant water, pipelines for output and flow control for the outcoming liquid.

The column with a diameter of 1.0 m was filled with a weakly acid cation exchange resin (Finex CA 16 GC) manufactured by Finex Ltd, Finland. The resin was methylacrylate-based resin. The height of the resin bed was approximately 5.0 m. The degree of cross-linkage was 8 w-% DVB and the average particle size of the resin was 0.28 mm. The resin was regenerated into sodium ($Na^+$) form and a feeding device was placed at the top of the resin bed. The temperature of the column, feed solution and eluant water was 65° C. The flow rate in the column was adjusted to 785 l/h.

The pH of the feed solution was adjusted to pH 6.5, after which the solution was filtered.

Chromatographic separation was carried out as follows:

Step 1. The dry substance content of the feed solution was adjusted to 35 g dry substance in 100 g of solution according to the refractive index (RI) of the solution.

Step 2. 250 l of the preheated feed solution was pumped to the top of the resin bed.

Step 3. The feed solution was eluted downwards in the column by feeding preheated ion-exchanged water to the top of the column. The pH and ion-form of the resin were balanced by several feeds before sampling.

Step 4. The density and conductivity of the outcoming solution were measured continuously. The outcoming solution was collected and divided into three fractions (when the feed profiles were not overlapping) in the following order: first residual fraction (containing most of the salts), rhamnose-rich fraction (containing most of the rhamnose) and second residual fraction (containing most of the xylose and other monosaccharides).

The amount of dry substance as well as rhamnose and xylose content in the feed solution and in the product fraction are presented in Table 3. The concentrations of the components are expressed as percentages of the total dry substance content in the particular fraction. The yield of rhamnose in product fraction is also presented (the amount of the component in the particular fraction in relation to the total amount of that component in all outcoming fractions).

TABLE 3

| | Compositions and yields | | |
|---|---|---|---|
| | Feed solution (nominal) | Rhamnose fraction (analyzed from samples) | Residual fraction (analyzed from samples) |
| DS in fraction, kg | 100 | 39 | 67 |
| DS g/100 g solution | 35.5 | 8.6 | 4.5 |
| Rhamnose, % on DS | 21.6 | 47.0 | 4.5 |
| Xylose, % on DS | 23.1 | 6.2 | 29.2 |
| Rhamnose, yield % | | 86.0 | |

The rhamnose content (% of the total dry substance content) in the product fraction was 2.2-fold compared to the rhamnose content in the feed solution. Rhamnose was separated from the feed solution with a good yield and eluted from the column essentially before the other sugars.

Example 5

Chromatographic Separation of Rhamnose-rich Fraction with a Weakly Basic Anion Exchange Resin A solution prepared according to Example 3 (containing rhamnose and xylose) was subjected to a chromatographic separation. The separation was performed in a chromatographic separation column as a batch process. The equipment consisted of feed and eluant water containers, a heat exchanger, a chromatographic separation column having a heat jacket, pipelines for input of feed solution as well as eluant water, pipelines, a pump and a sample collector for outflow. The column with a diameter of 0.09 m was filled with a weakly basic anion exchange resin (Finex AA 545 GC) manufactured by Finex Ltd., Finland. The resin was a methylacrylate aminolyzed with dimethylaminopropylamine-based resin. The height of the resin bed was about 1.4 m. The cross-linkage degree of the resin was 4 w-% DVB and the average particle size of the resin was 0.385 mm. The resin was regenerated into $SO_4^{2-}$ form and a feeding device was placed at the top of the resin bed. The temperature of the column and feed solution and eluant water was 50° C. The flow rate in the column was adjusted to 43 ml/min. The pH of the feed solution was adjusted to pH 4 with sulphuric acid. Filtration of the feed solution was made by vacuum filtration before the tests.

The chromatographic separation was carried out as follows:

Step 1: The dry substance content of the feed solution was adjusted to 30 g dry substance in 100 g solution according to the refractive index (RI) of the solution.

Step 2: 750 ml of preheated feed solution was pumped to the top of the resin bed.

Step 3: The feed solution was eluted downwards in the column by feeding preheated ion-exchanged water to the top of the column. The pH and ion-form of the resin were balanced by several feeds before sampling.

Step 4: 43 ml samples of the outcoming solution were collected at 3 min intervals. The composition of the samples was analyzed with Dionex HPLC equipment with pulsed electrochemical detector and CarboPac PA1™ anion exchange column (water and 0.2 M NaOH as eluants).

Resin gives a good separation of rhamnose from other monosaccharides. First salts were eluted from the column. Rhamnose eluted from the column before other monosaccharides and was partly overlapping with salts. Other monosaccharides eluted from the column after rhamnose. The outcoming separation profile was divided into five fractions in the following order: first residual fraction (containing most of the salts), first recycle fraction, rhamnose rich fraction (containing most of the rhamnose), second recycle fraction and second residual fraction (containing most of the xylose and other monosaccharides).

Figure 5:
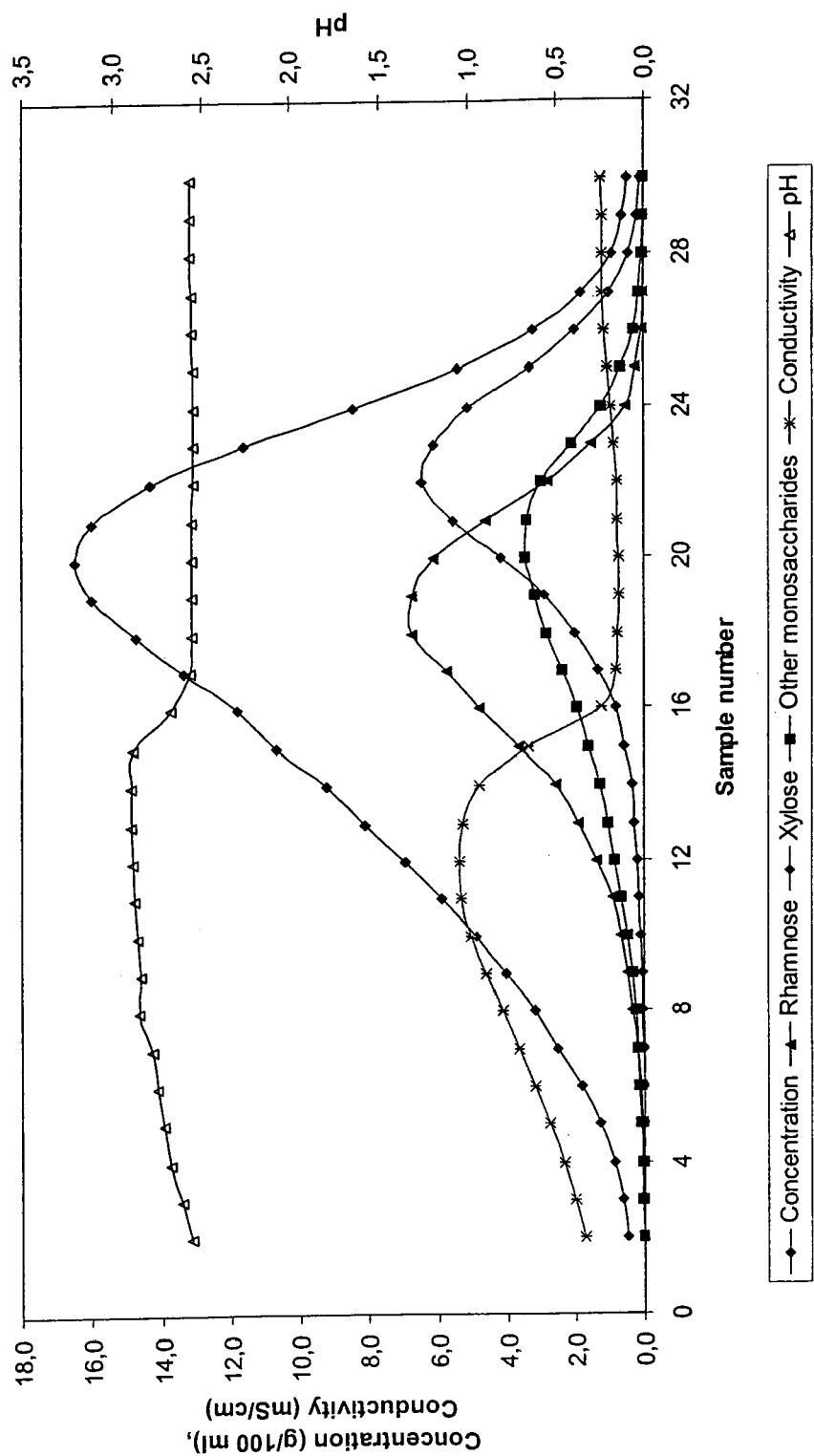
FIG. 5 is a graphical presentation of the elution profiles and pH according to Example 5.
Figure 6:
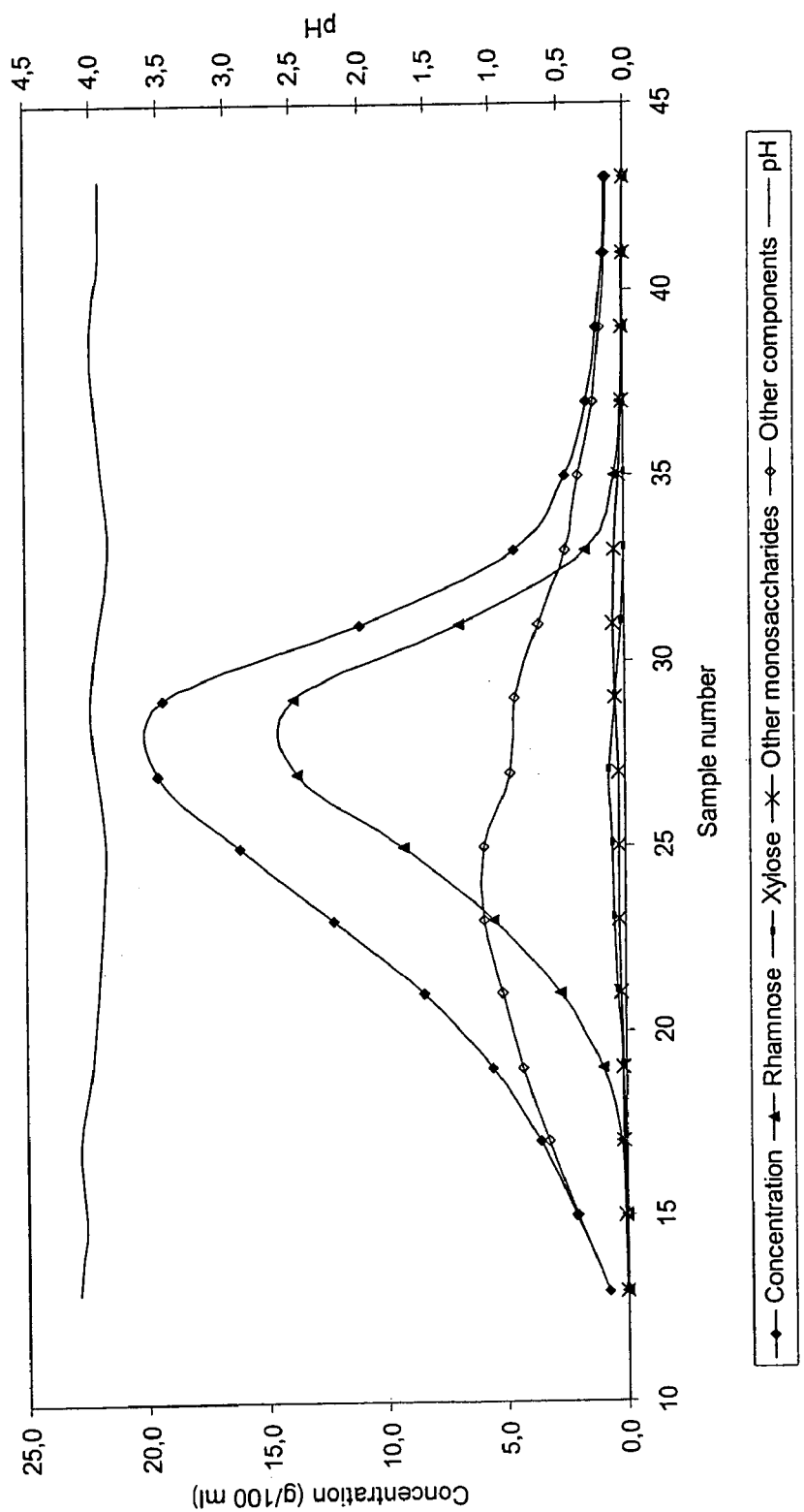
FIG. 6 is a graphical presentation of the elution profiles and pH according to Example 6.

The pH of the effluent was between 2.5 and 3. The results are shown graphically in FIG. 5.

The amount of dry substance as well as rhamnose and xylose content in the feed solution and in product fractions are presented in Table 4. The concentrations of the components are expressed as percentages of the total dry substance content in the particular fraction. The yield of rhamnose in product fractions is also presented (the amount of the component in the particular fraction in relation to the total amount of that component in all outcoming fractions).

TABLE 4

Compositions and yields

|  | Feed solution | Rhamnose fraction (analyzed from samples) | Combined residual fractions (analyzed from samples) |
| --- | --- | --- | --- |
| DS in fraction, g | 253 | 125 | 81 |
| DS g/100 g solution | 29.7 | 13.2 | 3.4 |
| Rhamnose, % on DS | 26.8 | 39.2 | 9.7 |
| Xylose, % on DS | 22.2 | 16.6 | 33.1 |
| Rhamnose, yield % |  | 86.1 |  |

The rhamnose content (% of the total dry substance content) in the product fraction was 1.4-fold compared to rhamnose content in feed solution. Rhamnose was separated from the feed solution with a good yield.

Example 6

Chromatographic Separation of Rhamnose-rich Fraction with a $Ca^{2+}$-Form Strong Acid Cation Exchange Resin A/The rhamnose rich fraction prepared according to Example 4 was subjected to a chromatographic separation in a batch separation column. The separation was performed in a pilot scale chromatographic separation column as a batch process.

The equipment consisted of a feed tank, a feed pump, a heat exchanger, a chromatographic separation column, product containers, pipelines for input of feed solution as well as eluant water, pipelines for output and flow control for the outcoming liquid.

The column with a diameter of 0.6 m was filled with a strong acid cation exchange resin (Finex CS 11 GC) manufactured by Finex Ltd, Finland. The height of the resin bed was approximately 5.0 m. The degree of crosslinkage was 5.5 w-% DVB and the average particle size of the resin was 0.40 mm. The resin was regenerated into calcium ($Ca^{2+}$) form and a feeding device was placed at the top of the resin bed. The temperature of the column, feed solution and eluant water was 65° C. The flow rate in the column was adjusted to 210 l/h.

The pH of the feed solution was adjusted to pH 6.5, after which the solution was filtered.

Chromatographic separation was carried out as follows:

Step 1. The dry substance content of the feed solution was adjusted to 30 g dry substance in 100 g of solution according to the refractive index (RI) of the solution.

Step 2. 110 l of the preheated feed solution was pumped to the top of the resin bed.

Step 3. The feed solution was eluted downwards in the column by feeding preheated ion-exchanged water to the top of the column. The pH and ion-form of the resin were balanced by several feeds before sampling.

Step 4. The density and conductivity of the outcoming solution were measured continuously. The outcoming solution was collected and divided into three fractions (when the feed profiles were not overlapping) in the following order: first residual fraction (containing components other than monosaccharides), rhamnose rich fraction (containing most of the rhamnose) and second residual fraction (containing other monosaccharides and other components).

The amount of dry substance as well as rhamnose content in the feed solution and in the product fraction is presented in Table 5. The concentration of rhamnose is expressed as percentage of the total dry substance content in the particular fraction. The yield of rhamnose in the product fraction is also presented (the amount of the component in the particular fraction in relation to the total amount of that component in all outcoming fractions).

TABLE 5

Compositions and yields

|  | Feed solution (nominal) | Rhamnose fraction (analyzed from samples) | Combined residual fractions (analyzed from |
| --- | --- | --- | --- |
| DS in fraction, kg | 37 | 34.8 | 3.7 |
| DS g/100 g solution | 30 | 10.2 | 1.6 |
| Rhamnose, % on DS | 47.9 | 55.4 | 5.4 |
| Rhamnose, yield % |  | 99.0 |  |

The rhamnose purity was increased by 16%. The rhamnose yield was excellent, being 99%.

Example 7

Chromatographic Separation of Rhamnose Rich Fraction with a $Ca^{2+}$ Form Strong Acid Cation Exchange Resin A/The rhamnose rich fraction prepared according to the method in Example 5 but using bigger equipment was subjected to a chromatographic separation in a batch separation column. The separation was performed in a pilot scale chromatographic separation column as a batch process.

The equipment consisted of a feed tank, a feed pump, a heat exchanger, a chromatographic separation column, product containers, pipelines for input of feed solution as well as eluant water, pipelines for output and flow control for the outcoming liquid.

The column with a diameter of 0.6 m was filled with a strong acid cation exchange resin (Finex CS 11 GC) manufactured by Finex Ltd, Finland. The height of the resin bed was approximately 5.0 m. The degree of crosslinkage was 5.5 w-% DVB and the average particle size of the resin was 0.40 mm. The resin was regenerated into calcium ($Ca^{2+}$) form and a feeding device was placed at the top of the resin bed. The temperature of the column, feed solution and eluant water was 65° C. The flow rate in the column was adjusted to 210 l/h.

The pH of the feed solution was adjusted to pH 6.5, after which the solution was filtered.

Chromatographic separation was carried out as follows:

Step 1. The dry substance content of the feed solution was adjusted to 30 g dry substance in 100 g of solution according to the refractive index (RI) of the solution.

Step 2. 110 l of the preheated feed solution was pumped to the top of the resin bed.

Step 3. The feed solution was eluted downwards in the column by feeding preheated ion-exchanged water to the top of the column. The pH and ion-form of the resin are balanced by several feeds before sampling.

Step 4. The density and conductivity of the outcoming solution were measured continuously. The outcoming solution was collected and divided into five fractions (when the feed profiles were not overlapping) in the following order: first residual fraction (containing mainly components other than monosaccharides), first recycle fraction (containing also small amounts of rhamnose and other monosaccharides), rhamnose rich fraction (containing most of the rhamnose), second recycle fraction and second residual fraction (containing other monosaccharides and other components).

The amount of dry substance as well as rhamnose content in the feed solution, in the product fractions and also in the combined recycle fraction is presented in Table 6. The concentration of rhamnose is expressed as percentage of the total dry substance content in the particular fraction. The yield of rhamnose in the product fraction is also presented (the amount of the component in the particular fraction in relation to the total amount of that component in all outcoming fractions—excluding recycle fraction).

TABLE 6

Compositions and yields

| | Feed solution | Rhamnose fraction | Residual fraction | Recycle fraction |
|---|---|---|---|---|
| DS in fraction, kg | 37 | 23.8 | 6.4 | 6.4 |
| DS g/100 g solution | 30 | 14.2 | 2.0 | 7.4 |
| Rhamnose, % on DS | 40.3 | 52.3 | 7.9 | 24.6 |
| Rhamnose, yield-% | | 96.1 | | |

The rhamnose purity was increased by 30%. The rhamnose yield was excellent, being 96.1%.

Example 8

Chromatographic Separation of Vinasse with a Weakly Basic Anion Exchange Resin

A vinasse solution, which contains e.g. salts, betaine, inositol and glycerol, was subjected to a chromatographic separation. The separation was performed in a chromatographic separation column as a batch process. The equipment consisted of a feed and eluant water containers, a heat exchanger, a chromatographic separation column having a heat jacket, pipelines for input of feed solution as well as eluant water, pipelines and a pump for outflow and a sample collector. The column with a diameter of 0.09 m was filled with a weakly base anion exchange resin (Finex AA 545 GC) manufactured by Finex Ltd., Finland. The resin was an acrylic-based resin. The height of the resin bed was about 1.4 m. The cross-linkage degree of the resin was 4 w-% DVB and the average particle size of the resin was 0.385 mm. The resin was regenerated into $SO_4^{2-}$ form and a feeding device was placed at the top of the resin bed. The temperature of the column and feed solution and eluant water was 50° C. The flow rate in the column was adjusted to 43 ml/min. The pH of the feed solution was pH 5.4. Filtration of the feed solution was carried out by vacuum filtration before the tests.

The chromatographic separation was carried out as follows:

Step 1: The dry substance content of the feed solution was adjusted to 30 g dry substance in 100 g solution according to the refractive index (RI) of the solution.

Step 2: 750 ml of preheated feed solution was pumped to the top of the resin bed.

Step 3: The feed solution was eluted downwards in the column by feeding preheated ion-exchanged water to the top of the column. The pH and ion-form of the resin were balanced by several feeds before sampling.

Step 4: 43 ml samples of the outcoming solution were collected at 3 min intervals. The composition of the samples was analyzed with HPLC equipment with a refractive index (RI) detector and $Ca^{2+}$ form cation exchange column (0.001M $Ca(NO_3)_2$ as an eluant) and also with a $Na^+$ form cation exchange column (0.003M $Na_2SO_4$ as an eluant).

Figure 7:
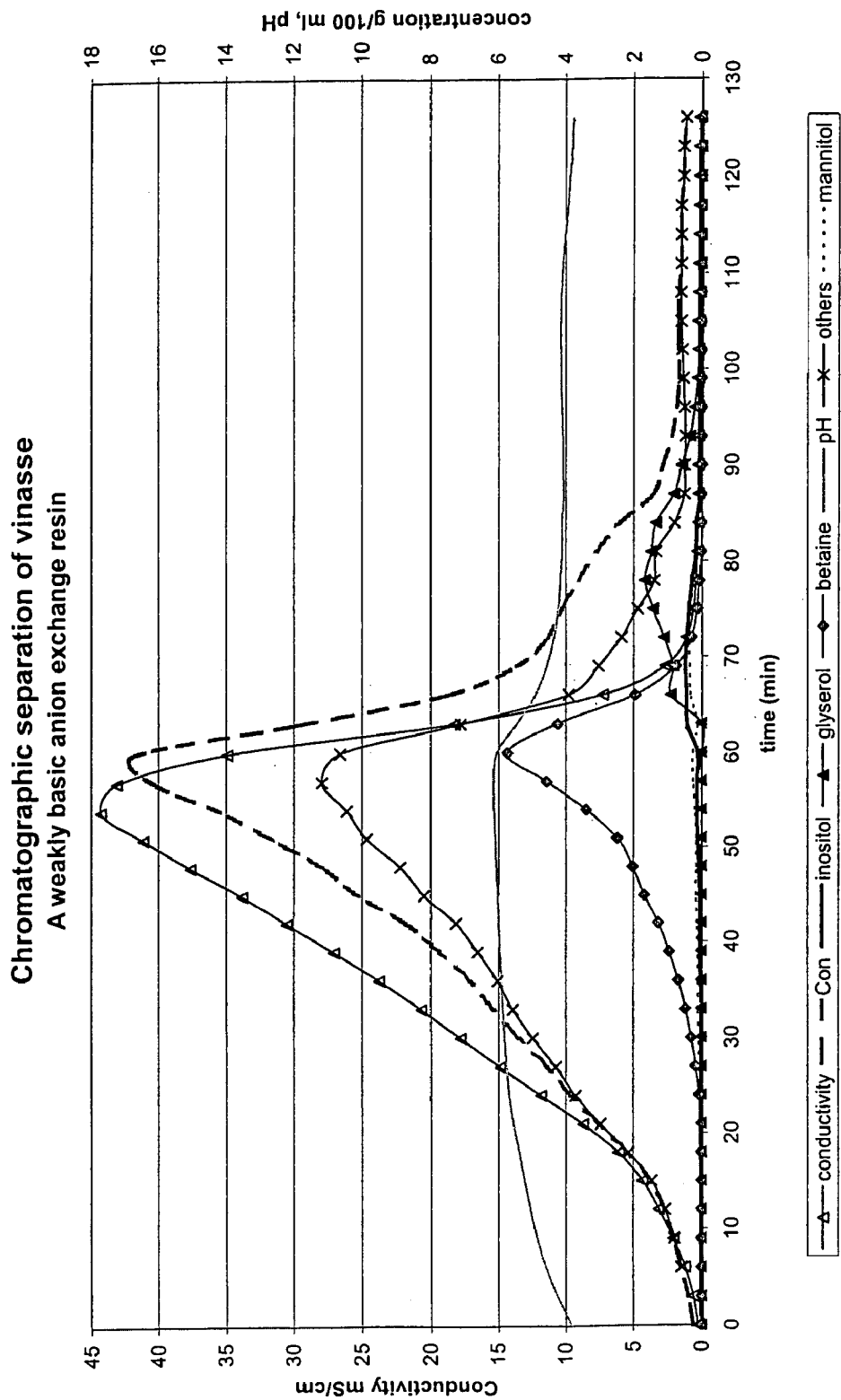
FIG. 7 is a graphical presentation of the elution profiles and pH according to Example 8.

Resin separates glycerol and inositol from betaine and most of the other compounds. The results are shown graphically in FIG. 7. A/The betaine fraction can be purified for example with $Na^+$ form SAC-resin, which removes the salts. By contrast, the vinasse solution can be subjected at first to SAC-resin and then to WBA-resin.

Example 9

Chromatographic Separation of Maltose Hydrolysate with a Weakly Basic Anion Exchange Resin A solution containing maltose, glucose and oligosaccharides was subjected to a chromatographic separation. The separation was performed in a chromatographic separation column as a batch process. The equipment consisted of feed and eluant water containers, a heat exchanger, a chromatographic separation column having a heat jacket, pipelines for input of feed solution as well as eluant water, pipelines and a pump for outflow and a sample collector. The column with a diameter of 0.09 m was filled with a weakly base anion exchange resin (Finex M 545 GC) manufactured by Finex Ltd., Finland. The resin was an acrylic-based resin. The height of the resin bed was about 1.5 m. The cross-linkage degree of the resin was 4 w-% DVB and the average particle size of the resin was 0.385 mm. The resin was regenerated into $SO_4^{2-}$ form and a feeding device was placed at the top of the resin bed. The temperature of the column and feed solution and eluant water was 50° C. The flow rate in the column was adjusted to 43 ml/min. The pH of the feed solution was pH 4.7. Filtration of the feed solution was made by vacuum filtration before the tests.

The chromatographic separation was carried out as follows:

Step 1: The dry substance content of the feed solution was adjusted to 20 g dry substance in 100 g solution according to the refractive index (RI) of the solution.

Step 2: 750 ml of preheated feed solution was pumped to the top of the resin bed.

Step 3: The feed solution was eluted downwards in the column by feeding preheated ion-exchanged water to the top of the column. The pH and ion-form of the resin were balanced by several feeds before sampling.

Step 4: 43 ml samples of the outcoming solution were collected at 3 min intervals. The composition of the samples was analysed with HPLC equipment with a refractive index (RI) detector and $Na^+$ form cation exchange column (0.003M $Na_2SO_4$ as an eluant).

Figure 8:
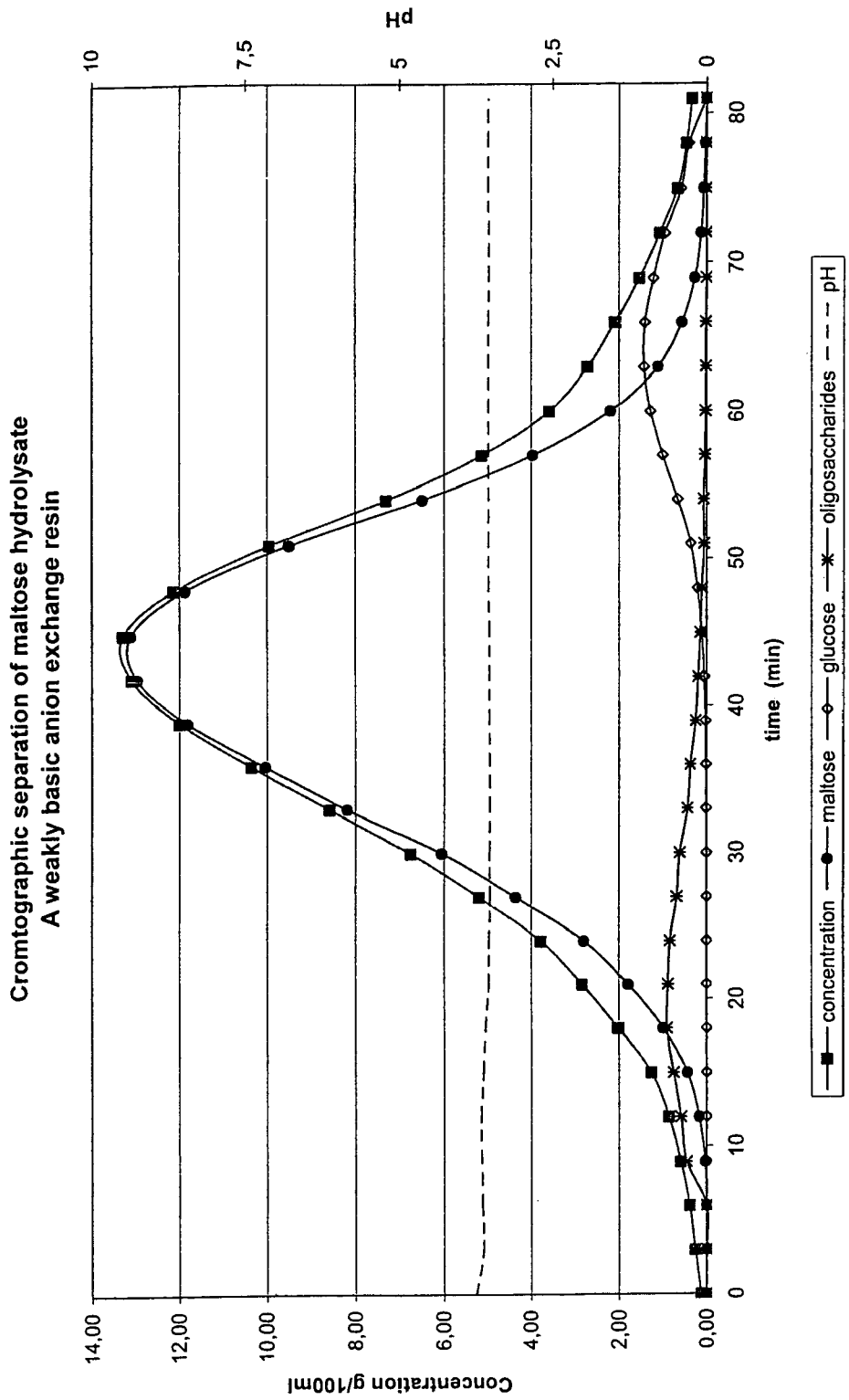
FIG. 8 is a graphical presentation of the elution profiles and pH according to Example 9.
Figure 9:
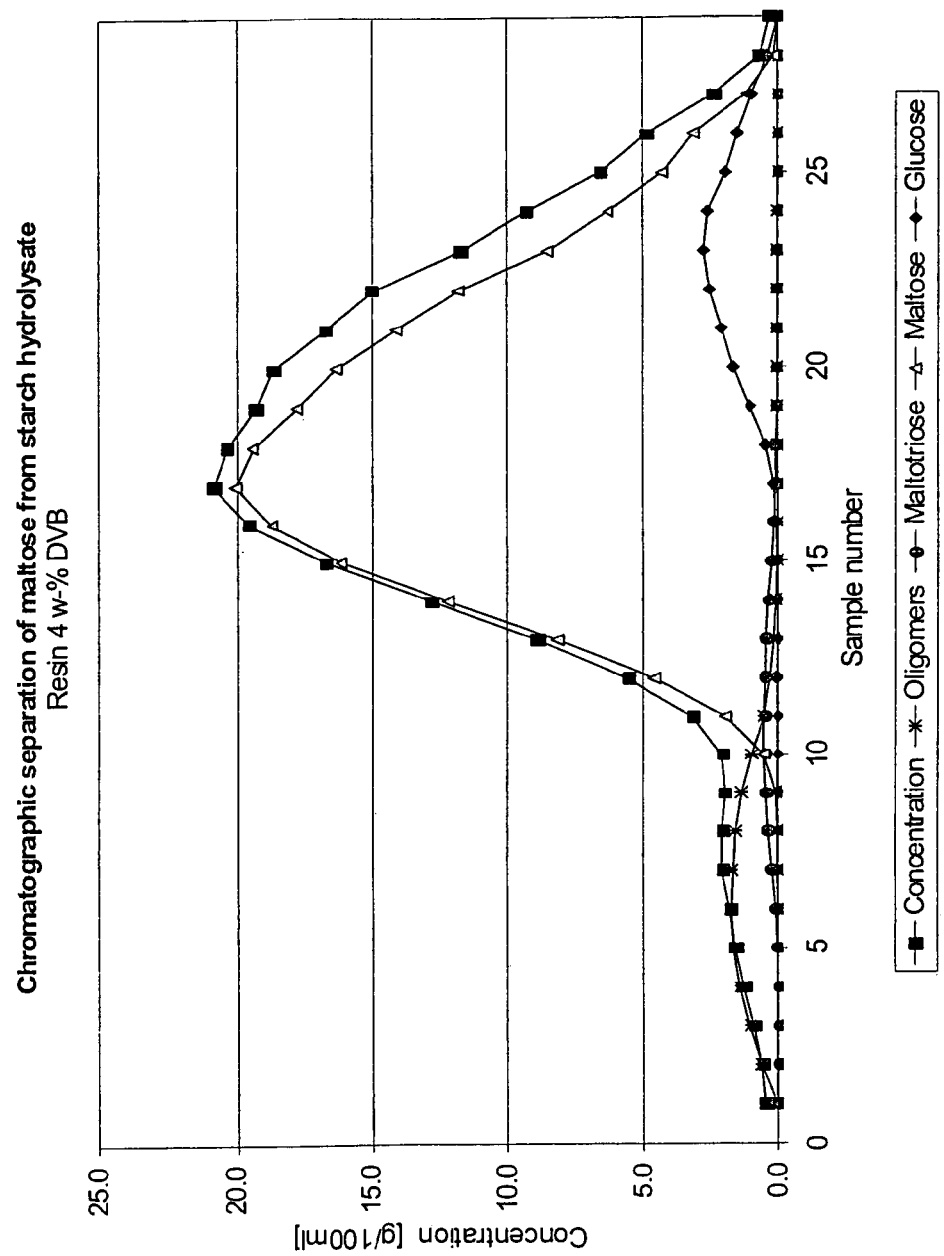
FIG. 9 is a graphical presentation of the elution profiles and pH according to Example 10.
Figure 10:
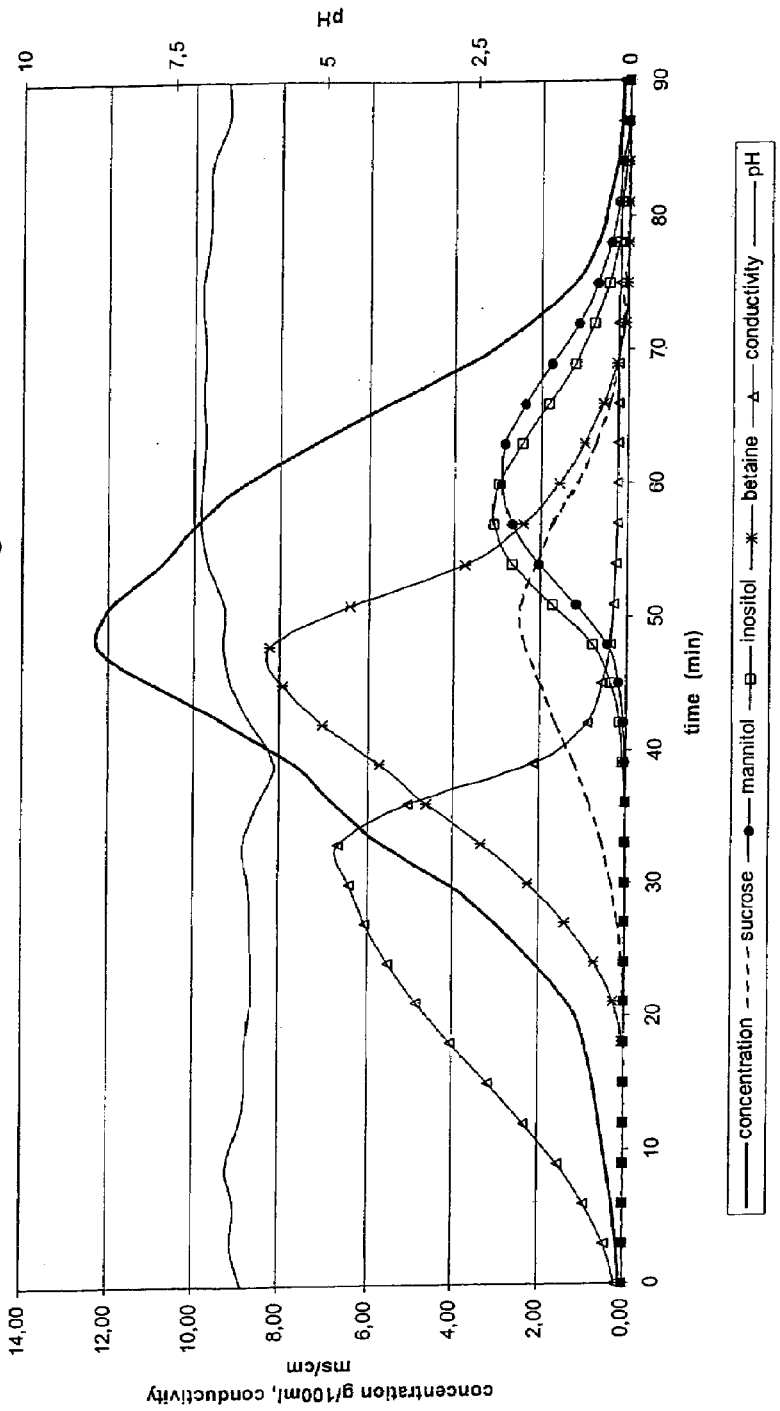
FIG. 10 is a graphical presentation of the elution profiles and pH according to Example 11.

Resin separates oligosaccharides, maltose and glucose from each other. Oligosaccharides were eluted from the column in the front and glucose in the back slope of the maltose separation profile. The pH of the effluent was between 3 to 4. The results are shown graphically in FIG. 8.

The amount of dry substance as well as the maltose content in the feed solution and in the product fraction is presented in Table 7. The separation profile was cut into three fractions: first residual fraction (containing oligosaccharides and some maltose), maltose rich fraction (containing most of the maltose) and second residual fraction (containing most of glucose). The concentration of maltose is expressed as percentage of the total dry substance content in the particular fraction. The yield of maltose in the product fraction is also presented (the amount of the component in the particular fraction in relation to the total amount of that component in all outcoming fractions). Oligosaccharide and glucose removals are also presented. Removal is expressed as the amount of the component in residual fractions compared to the amount of that component in residual fractions and in the product fraction.

TABLE 7

Compositions and yields

|  | Feed solution | Maltose fraction | Combined residual fraction |
|---|---|---|---|
| DS in fraction, g | 165 | 137 | 28 |
| DS g/100 g solution | 20 | 8.6 | 1.4 |
| Maltose, % on DS | 85.1 | 94.0 | 42.1 |
| Glucose, % on DS | 8.1 | 1.7 | 36.9 |
| Oligosaccharides, % on DS | 5.8 | 4.2 | 13.8 |
| Maltose, yield % |  | 91.5 |  |
| Oligosaccharide removal, % |  | 41 |  |
| Glucose removal, % |  | 81 |  |

WBA resin separated maltose well from other components. Especially, the resin separated maltose well from glucose. Maltose purity and yield were good.

Example 10

Chromatographic Separation of Maltose from Starch Hydrolysate with a Strongly Acid Cation Exchange Resin Starch hydrolysate (maltose hydrolysate) was subjected to a chromatographic separation in a batch separation column. The separation was performed in a pilot scale chromatographic separation column as a batch process.

The equipment consisted of a feed tank, a feed pump, a heat exchanger, a chromatographic separation column, product containers, pipelines for input of feed solution as well as eluant water, pipelines for output and, flow control for the outcoming liquid.

The column with a diameter of 0.225 m was filled with a strongly acid cation exchange resin. The height of the resin bed was approximately 5.2 m. The degree of cross-linkage was 4 w-% DVB and the average particle size of the resin was 0.36 mm. The resin was regenerated into sodium ($Na^+$) form and a feeding device was placed at the top of the resin bed. The temperature of the column, feed solution and eluant water was 80° C. The flow rate in the column was adjusted to 30 l/h.

Chromatographic separation was carried out as follows:

Step 1. The dry substance content of the feed solution was adjusted to 36 g dry substance in 100 g of solution according to the refractive index (RI) of the solution.

Step 2. 15 l of the preheated feed solution was pumped to the top of the resin bed.

Step 3. The feed solution was eluted downwards in the column by feeding preheated ion-exchanged water to the top of the column. The pH and ion-form of the resin were balanced by several feeds before sampling.

Step 4. The density and conductivity of the outcoming solution were measured continuously. The outcoming solution was collected and divided into five fractions in the following order: first residual fraction (containing oligosaccharides), recycle fraction (containing mostly maltose and maltotriose), maltose rich fraction (containing most of the maltose), second recycle fraction (containing mostly maltose and glucose) and second residual fraction (containing mostly glucose). Both recycle fractions were combined with the feed solution to dilute the feed to a suitable concentration.

The amount of dry substance as well as maltose content in the feed solution and in the product fraction are presented in Table 8. The concentration of maltose is expressed as percentage of the total dry substance content in the particular fraction. The yield of maltose in the product fraction is also presented (the amount of the component in the particular fraction in relation to the total amount of that component in all outcoming fractions). Oligosaccharide, maltotriose and glucose removals are also presented. Removal is expressed as the amount of the component in residual fractions compared to the amount of that component in residual fractions and in the product fraction.

TABLE 8

Compositions and yields

|  | Feed solution | Maltose fraction | Combined residual fraction |
|---|---|---|---|
| DS in fraction, kg | 6.0 | 2.8 | 0.9 |
| DS g/100 g solution | 36 | 16 | 2.3 |
| Maltose, % on DS | 83 | 89 | 54 |
| Maltotriose, % on DS | 2.0 | 0.3 | 9.6 |
| Glucose, % on DS | 6.5 | 9.0 | 1.8 |
| Oligosaccharides, % on DS | 6.2 | 0.1 | 32.0 |
| Maltose, yield % |  | 84 |  |
| Oligosaccharide removal, % |  | 99 |  |
| Maltotriose removal, % |  | 92 |  |
| Glucose removal, % |  | 6.1 |  |

A resin with 4 w-% DVB separated maltose well from other components. Especially, the resin separated maltose well from oligosaccharides and maltotriose. Maltose purity was increased by 7%. Maltose yield was good, being 84%.

Example 11

Chromatographic Separation of Betaine and Inositol Containing Solution with Weakly Basic Anion Exchange Resin A solution containing sucrose, betaine, mannitol, inositol and salt ($Na_2SO_4$) in the ratio of 15:50:15:15:5 was subjected to a chromatographic separation. The separation was performed in a chromatographic separation column as a batch process. The equipment consisted of feed and eluant water containers, a heat exchanger, a chromatographic separation column having a heat jacket, pipelines for input of feed solution as well as eluant water, pipelines and a pump for outflow and a sample collector. The column with a diameter of 0.09 m was filled with a weakly base anion exchange resin (Finex AA 545 GC) manufactured by Finex Ltd., Finland. The resin was an acrylic-based resin. The height of the resin bed was about 1.5 m. The cross-linkage degree of the resin was 4 w-% DVB and the average particle size of the resin was 0.385 mm. The resin was regenerated into $SO_4^{2-}$ form and a feeding device was placed at the top of the resin bed. The temperature of the column and feed solution and eluant water was 50° C. The flow rate in the column was adjusted to 43 ml/min. The pH of the feed solution was adjusted to pH 4.4 with sulphuric acid. Filtration of the feed solution was made by vacuum filtration before the tests.

The chromatographic separation was carried out as follows:

Step 1: The dry substance content of the feed solution was adjusted to 20 g dry substance in 100 g solution according to the refractive index (RI) of the solution.

Step 2: 750 ml of preheated feed solution was pumped to the top of the resin bed.

Step 3: The feed solution was eluted downwards in the column by feeding preheated ion-exchanged water to the top of the column. The pH and ion-form of the resin were balanced by several feeds before sampling.

Step 4: 43 ml samples of the outcoming solution were collected at 3 min intervals. The composition of the samples was analyzed with HPLC equipment with a refractive index (RI) detector and $Na^+$ form cation exchange column (0.003M $Na_2SO_4$ as an eluant).

With this resin it is possible to separate e.g. inositol from betaine. The composition of the feed solution as well as some maximum purities analyzed from the profile samples are shown in Table 9.

TABLE 9

The composition of the feed solution

| | % on DS | Max purity % on RI-DS |
|---|---|---|
| Na2SO4 | 5 | |
| Sucrose | 15 | |
| Mannitol | 15 | 55.9 |
| Inositol | 15 | 34.1 |
| Betaine | 50 | 76.8 |

Elution volumes, partition coefficients and a separation factor for inositol and betaine are shown in Table 10. A/The partition coefficient K(d) for a particular component is calculated from the following equation:

$$K(d)=[V(e)-V(0)]/V(i) \quad (1)$$

where:
V(e) is the elution volume of a particular component (e.g. the volume of effluent from the start of feeding till the highest concentration peak of that component).
V(0) is the void volume (e.g. the volume of effluent from the start of feeding until the salts start to elute from the column).
V(i) is the inside volume of the resin bead (e.g. approximately 45% of resin bed volume).

Separation factor α is the proportion of partition coefficients of different components.

TABLE 10

Elution volumes, partition coefficients and separation factors

| | Elution volume V(e) (ml) | Partition coefficient K(d) | Separation factor α Inositol/betaine |
|---|---|---|---|
| Betaine | 5676 | 0.49 | 1.24 |
| Inositol | 6149 | 0.6 | |

Example 12

Selectivity Values of Different WBA-resins Compared with SAC- and WAC-Resins The selectivities of three acrylic-based WBA-resins having different functionality amines and one epichlorohydrin-based WBA-resin were studied by using rhamnose-arabinose-xylose and betaine-inositol-mannitol-glyserol solutions. The partition coefficients for each component were determined with the test tube method. Selectivity was calculated from the partition coefficients for each component pair.

The functionality amine in 1. WBA (Finex AA 546 GC) was tetraethylenepentamine, in 2. WBA (AA 547 GC) it was pentaethylenehexamine and in 3. WBA (Finex AA 548 GC) it was triethylenetetramine. The crosslinking degree of these resins were 4% DVB. Functionality amine in epichlorohydrin-based polycondensation WBA-resin (no 4) manufactured also by Finex was triethylenetetramine. Resins were regenerated into $SO_4^{2-}$ ion form before the tests.

For comparison the parameters were determined also for one SAC (strongly acidic cation exchange resin, 5.5% DVB) and one WAC-resin (weakly acid cation exchange resin, 8% DVB). Both resins were regenerated into $Na^+$ ion form before the tests.

Solutions that were studied were prepared as follows:

Solution A: 1.9 g of arabinose, 19 g of xylose and 3.8 g of rhamnose were weighed into 100 ml.

Solution B: Arabinose, xylose and rhamnose, 8.3 g of each were weighed into 100 ml.

Solution C: 15 g of betaine, 3.75 g of inositol, 2.5 g of mannitol and 3.75 g of glyserol were weighed into 100 ml.

The pH of the three above solutions was adjusted for WBA-resin tests to pH 3, for SAC-resin tests to pH 6 and for WAC-resin tests to pH 8.5.

All resins were surface dried by centrifuging (15 min/ 2000 rpm) and then about 6 g of each surface dry resin was weighed accurately into 10 ml glass blood tubes. 4 ml of the solution in question was added and the tubes were tempered for 1 hour in 65° C. The resin no 4 was tempered overnight. A sample was sucked with a syringe through the stopper and the concentration of the components "outside the resin" ($C_{out}$) were analysed by HPLC.

The samples containing solutions A and B were analysed by HPLC equipment with refractive index (RI) detector and $Pb^{2+}$ form cation exchange column water as an eluant. The composition of the samples containing solution C were analysed with HPLC equipment with refractive index (RI) detector and $Ca^{2+}$ form cation exchange column (0,001M $Ca(NO_3)_2$ as an eluant.

The component concentration inside the resin was calculated by using the following equation, $$C_{resin} = m/V_{resin},$$

where m is the mass of the component in the resin and $V_{resin}$ is the volume of the resin. $V_{resin}$ was calculated by dividing the weighed resin amount with the resin density. The original added solution volume $V_i$ was assumed to be constant ($V_{out}$=4 ml).

Partition coefficient to each sugar respectively was calculated by using the equation of $$K = C_{resin}/C_{out}$$

Figure 11:
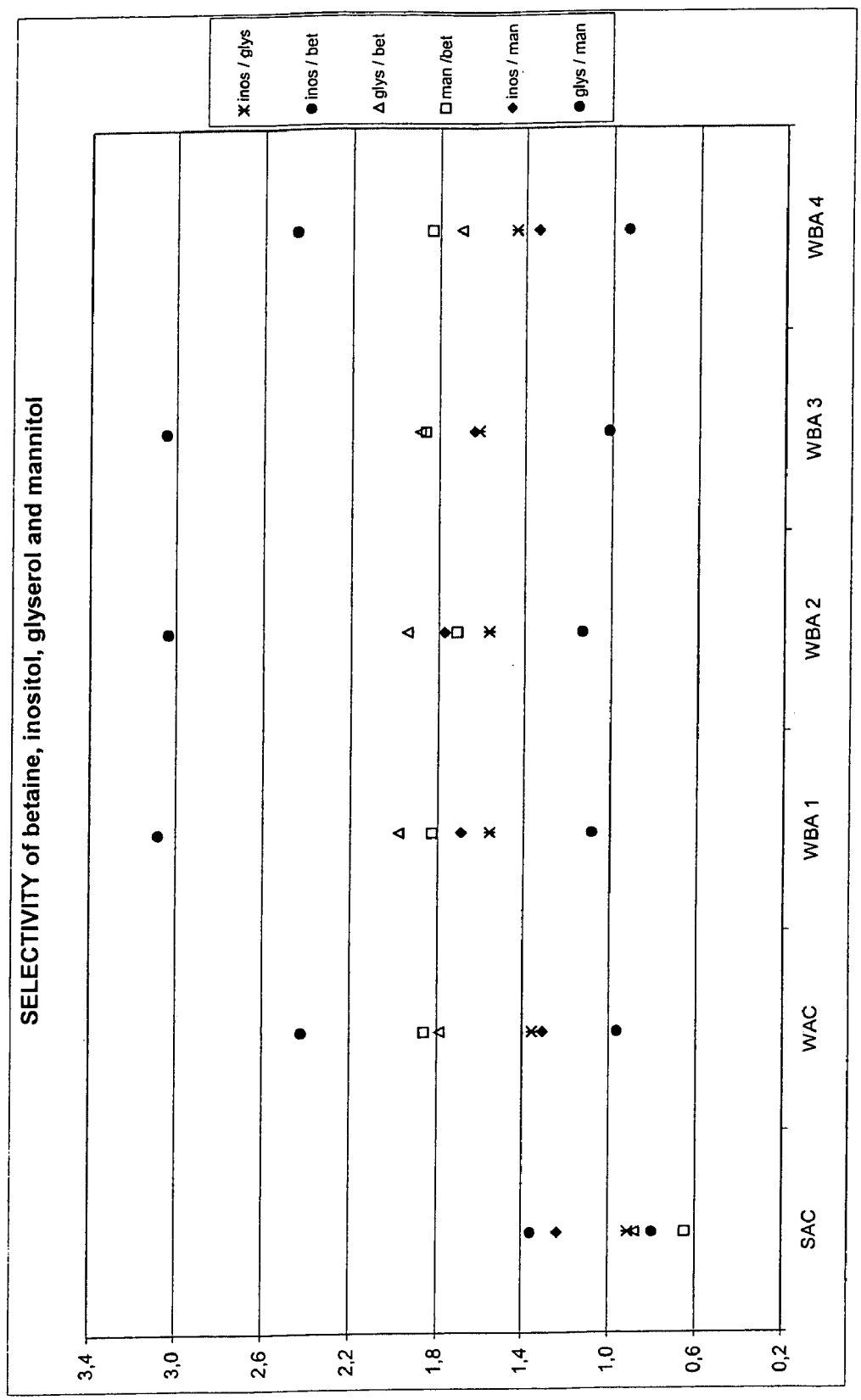
FIGS. 11 and 12 are graphical presentations of the selectivities of different resins according to Example 12.
Figure 12:
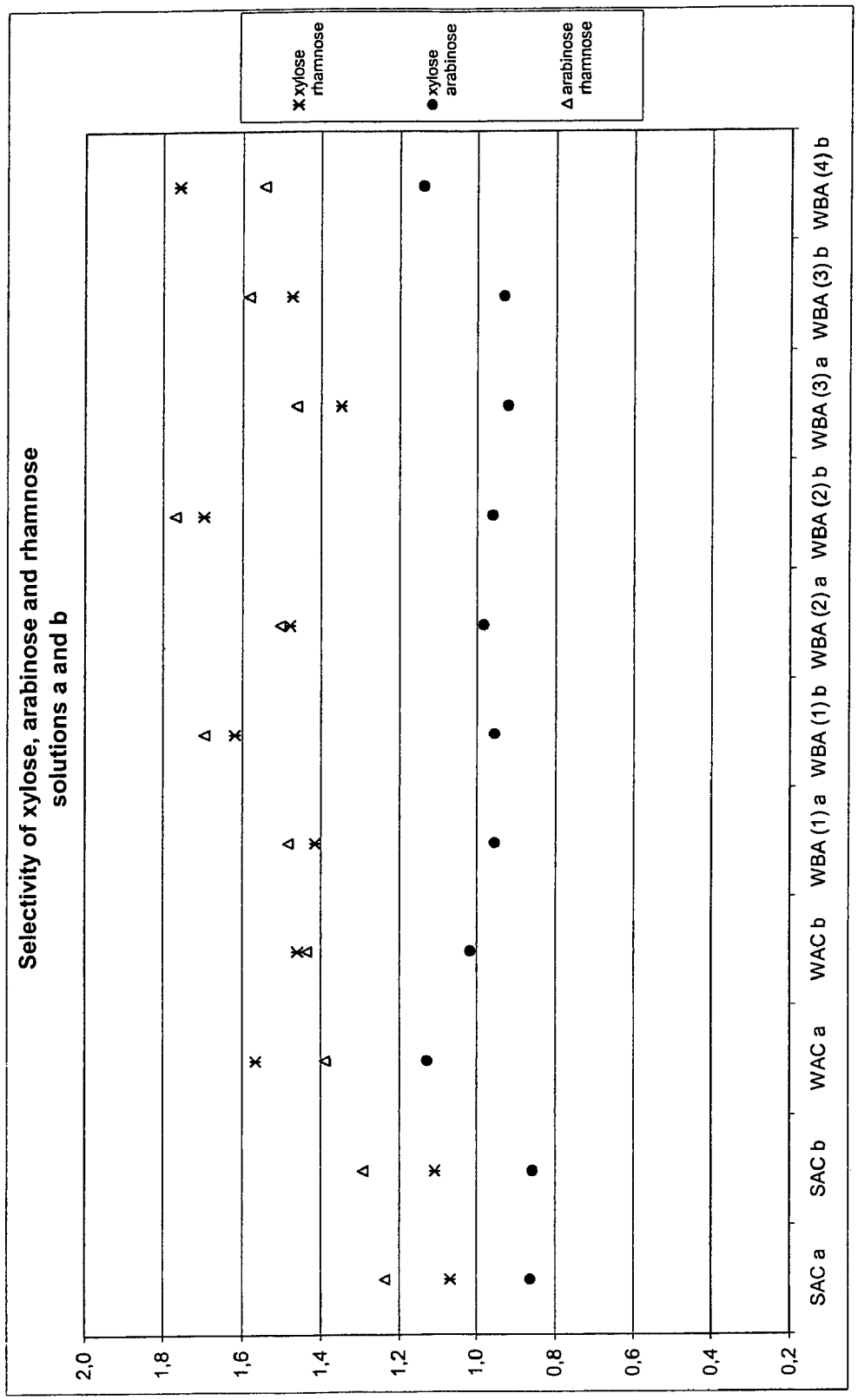

Selectivity was calculated separately for each studied component pair: $\alpha = K_1/K_2$. The selectivities are shown in FIG. 11 (solutions A and B) and 12 (solution C).

According to the results all the studied WBA-resins have a great selectivity for separating rhamnose from arabinose and xylose. In addition to this, the WBA-resins having tri- tetra- or pentaethylenetetramine as a functionality amine seem to be capable of separating e.g. inositol and glyserol from betaine better than the WAC or SAC-resins. The epichlorohydrin-based polycondensation WBA-resin having triethylenetetramine as a functionality amine has almost the same selectivities as the WAC-resin.

The invention claimed is:

1. A chromatographic separation method for separating a component from at least one other component in a solution comprising a mixture comprised of said component and said at least one other component, wherein said component and said at least one other component are selected from the group consisting of arabinose, rhamnose, glucose, xylitol, erythritol, inositol, mannitol, glycerol and betaine; wherein the method comprises at least one chromatographic separation step with a weakly basic anion exchange resin for separating said component from said at least one other component wherein said step comprises feeding said solution into a chromatographic column filled with the weakly basic anion exchange resin having an average particle size of 100-2000 micrometers, eluting said column with water and recovering a product fraction or product fractions, where the content of said component is higher than in the solution fed into the chromatographic separation step.

2. The method according to claim 1, wherein the method comprises an additional chromatographic separation step with a column filled with a weakly acid cation exchange resin.

3. The method according to claim 2, wherein the chromatographic separation step with a weakly acid cation exchange resin is carried out before the chromatographic separation step with a weakly basic anion exchange resin.

4. The method according to claim 3, wherein the chromatographic separation step with a weakly acid cation exchange resin comprises weakly acid separation.

5. The method according to claim 1, wherein the method comprises an additional chromatographic separation step with a column filled with a strongly acid cation exchange resin.

6. The method according to claim 1, wherein the weakly basic anion exchange resin is an acrylic-based resin.

7. The method according to claim 1, wherein the weakly basic anion exchange resin is based on a resin selected from the group consisting of polystyrene resins, epichlorohydrin-based anion exchange resins, aminated products of phenol or formaldehyde resins, aliphatic amines and ammonia polycondensation resins.

8. The method according to claim 1, wherein the pH of the feed solution is on the acidic side of the pH range.

9. The method according to claim 8, wherein the pH of the feed solution is from 3 to 5.

10. The method according to claim 1, wherein the method is a batch process.

11. The method according to claim 1, wherein the method is a simulated moving bed system.

12. The method according to claim 11, wherein the simulated moving bed system is continuous.

13. The method according to claim 11, wherein the simulated moving bed system is sequential.

14. The method according to claim 1, wherein the particle size of the weakly basic anion exchange resin ranges from 100 to 400 micrometers.

15. The method according to claim 1, wherein the weakly basic anion exchange resin has been regenerated into $SO_4^{2-}$ form.

16. The method according to claim 1, wherein the solution comprising the mixture that is fed into the chromatographic column is selected from the group consisting of hydrolysates and extracts from plants.

17. The method according to claim 16, wherein the hydrolysates and extracts from plants are selected from biomass hydrolysates, molasses, vinasse, xylose process streams, sucrose process streams, starch based streams and side streams thereof.

18. The method according to claim 1, wherein the resin is crosslinked with an aromatic crosslinker.

19. The method according to claim 18, wherein the resin is crosslinked with divinybenzene.

20. The method according to claim 19, wherein the crosslinking degree is from about 1 to about 10 weight-% divinylbenzene.

21. The method according to claim 20, wherein the crosslinking degree is from about 3 to about 8 weight-% divinylbenzene.

22. The method according to claim 1, wherein the resin can be crosslinked with an aliphatic crosslinker selected from the group consisting of isoprene, 1,7-octadiene, trivinylcyclohexane, diethylene glycol divinylether, N,N'-methylenebisacrylamide, N,N'-alkylenebisacrylamides, ethyleneglycol dimethacrylate, di-, tri-, tetra-, pentacrylate and pentamethacrylate.

23. The method according to claim 1, wherein the temperature of the column, the feed solution and water is between 10 and 95° C.

24. The method according to claim 1, characterized in that the temperature of the column, the feed solution and water is between 40 and 95°C.

25. The method according to claim 1, wherein the water is condensate water.

26. A chromatographic separation method for separating rhamnose from at least one other component in a solution comprising a mixture comprised of rhamnose and said at least one other component, wherein said at least one other component is selected from the group consisting of xylose, arabinose, glucose, xylitol, erythritol, inositol, mannitol, glycerol and betaine; wherein the method comprises at least one chromatographic separation step with a weakly basic anion exchange resin for separating rhamnose from said at least one other component, wherein said step comprises feeding said solution into a chromatographic column filled with the weakly basic anion exchange resin having an average particle size of 100-2000 micrometers, eluting said column with water and recovering a product fraction or product fractions, where the content of rhamnose is higher than in the solution fed into the chromatographic separation step.

27. A chromatographic separation method for separating rhamnose from a component selected from arabinose and xylose in a solution comprising a mixture comprised of rhamnose and at least one of arabinose and xylose, wherein the method comprises at least one chromatographic separation step with a weakly basic anion exchange resin for separating rhamnose from at least one of arabinose and xylose, wherein said step comprises feeding said solution into a chromatographic column filled with the weakly basic anion exchange resin having an average particle size of 100-2000 micrometers, eluting said column with water and recovering a product fraction or product fractions, where the content of rhamnose is higher than in the solution fed into the chromatographic separation step, and optionally a product fraction or product fractions, where the content of at least one of arabinose and xylose is higher than in the solution fed into the chromatographic separation step.

28. A chromatographic separation method for separating betaine from a component selected from inositol, glycerol and mannitol in a solution comprising betaine and at least one of inositol, glycerol and mannitol, wherein the method comprises at least one chromatographic separation step with a weakly basic anion exchange resin for separating betaine from at least one of inositol, glycerol and mannitol, wherein said step comprises feeding said solution into a chromatographic column filled with the weakly basic anion exchange resin having an average particle size of 100-2000 micrometers, eluting said column with water and recovering a product fraction or product fractions, where the content of betaine is higher than in the solution fed into the chromatographic separation step, and optionally a product fraction or product fractions, where the content of at least one of inositol, glycerol and mannitol is higher than in the solution fed into the chromatographic separation step.

29. A chromatographic separation method for separating inositol from a component selected from glycerol and mannitol in a solution comprising inositol and at least one of glycerol and mannitol, wherein the method comprises at least one chromatographic separation step with a weakly basic anion exchange resin for separating inositol from at least one of glycerol and mannitol, wherein said step comprises feeding said solution into a chromatographic column filled with the weakly basic anion exchange resin having an average particle size of 100-2000 micrometers, eluting said column with water and recovering a product fraction or product fractions, where the content of inositol is higher than in the solution fed into the chromatographic separation step, and optionally a product fraction or product fractions, where the content of at least one of glycerol and mannitol is higher than in the solution fed into the chromatographic separation step.

* * * * *

UNITED STATES PATENT AND TRADEMARK OFFICE
CERTIFICATE OF CORRECTION

PATENT NO. : 7,361,273 B2
APPLICATION NO. : 10/509266
DATED : April 22, 2008
INVENTOR(S) : Heikki Heikkila et al.

It is certified that error appears in the above-identified patent and that said Letters Patent is hereby corrected as shown below:

On the Title Page:

Item "(73) SaniscoSweetners Oy, Kantvik (FI)"

should read

Item --(73) Danisco Sweeteners Oy, Kantivik (FI)--

Signed and Sealed this

Ninth Day of September, 2008

JON W. DUDAS
*Director of the United States Patent and Trademark Office*